United States Patent [19]

Lemp

[11] Patent Number: 4,671,557
[45] Date of Patent: Jun. 9, 1987

[54] VEHICLE INTERIOR COVER PANEL MEANS

[75] Inventor: Mark D. Lemp, Sterling Heights, Mich.

[73] Assignee: Colt Industries Inc., New York, N.Y.

[21] Appl. No.: 793,193

[22] Filed: Oct. 31, 1985

[51] Int. Cl.[4] .............................................. B60R 5/04
[52] U.S. Cl. .............................. 296/37.16; 160/323 R
[58] Field of Search ................. 296/37.16; 160/323 R, 160/315, 318, 322; 267/156, 59; 242/107

[56] References Cited

U.S. PATENT DOCUMENTS

| | | | |
|---|---|---|---|
| 198,179 | 8/1886 | Anderson | 267/156 |
| 2,899,193 | 8/1959 | Foster | 267/156 |
| 3,909,060 | 9/1975 | Katayama | 296/37 R |
| 4,127,301 | 11/1978 | Syrowik | 296/37.16 |
| 4,139,231 | 2/1979 | Lang et al. | 296/37.16 |
| 4,168,094 | 9/1979 | Yagi | 296/37.16 |
| 4,222,601 | 9/1980 | White et al. | 296/37.16 |

*Primary Examiner*—Robert R. Song
*Attorney, Agent, or Firm*—Walter Potoroka, Sr.

[57] ABSTRACT

An automotive compartment cover assembly, for use in covering a compartment such as, for example, the windowed rear compartment of a hatchback or a station wagon type automotive vehicle, has in effect, a variable length elongated hollow cylindrical roller about which is rolled a flexible cover sheet member; at least one compression spring serves to provide a longitudinal resilient force in order to axially accommodate and provide for the variable length of the roller; at least one pre-stressed coiled retractor spring is provided for producing a rotational tension or force on the cover sheet member in a manner whereby such tension or force does not increase linearly as the cover sheet member is being extended from the roller.

49 Claims, 43 Drawing Figures

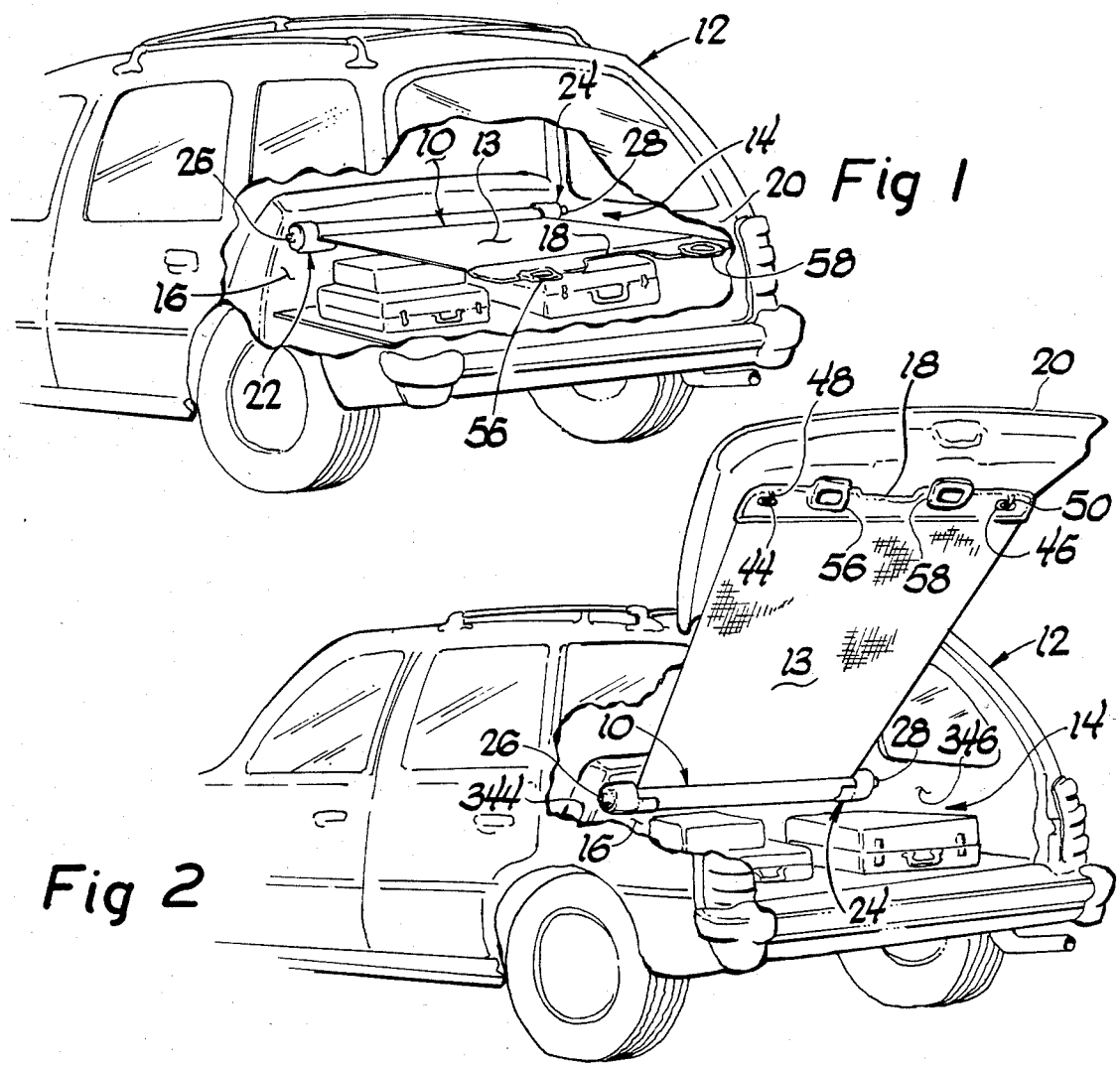
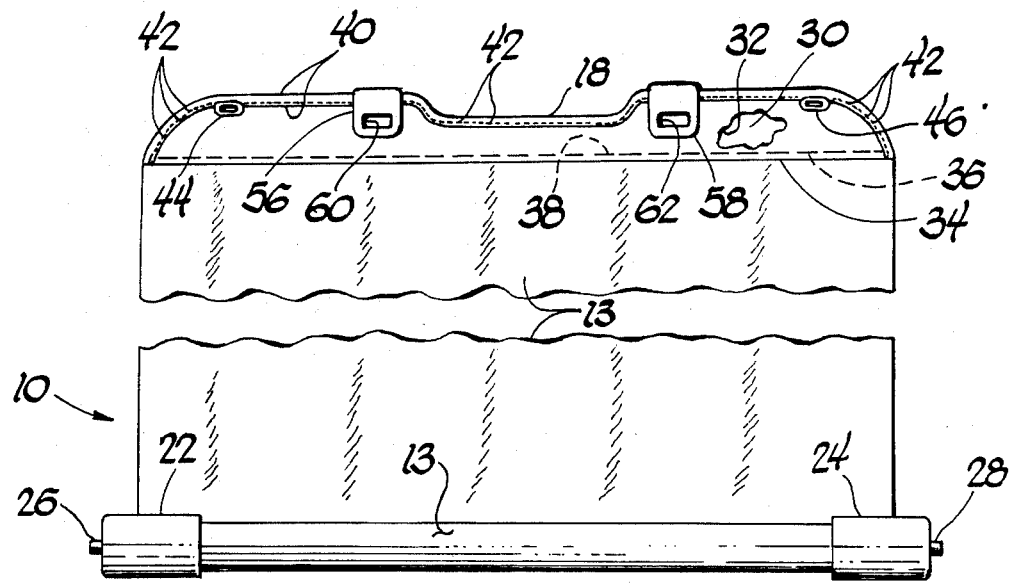
Fig 1
Fig 2
Fig 3

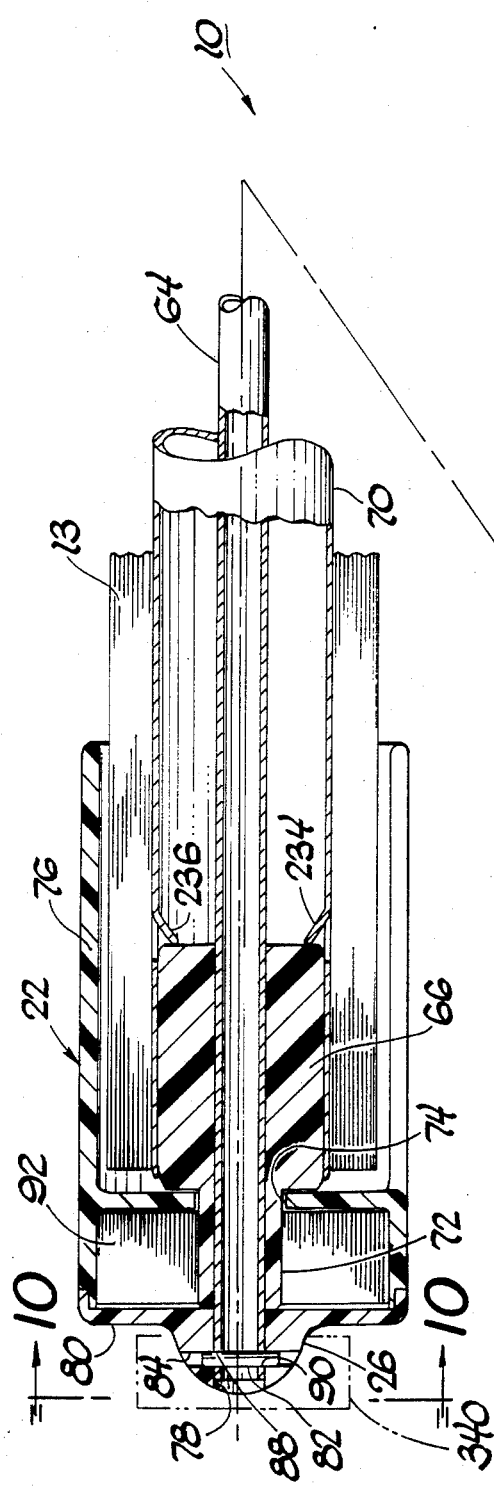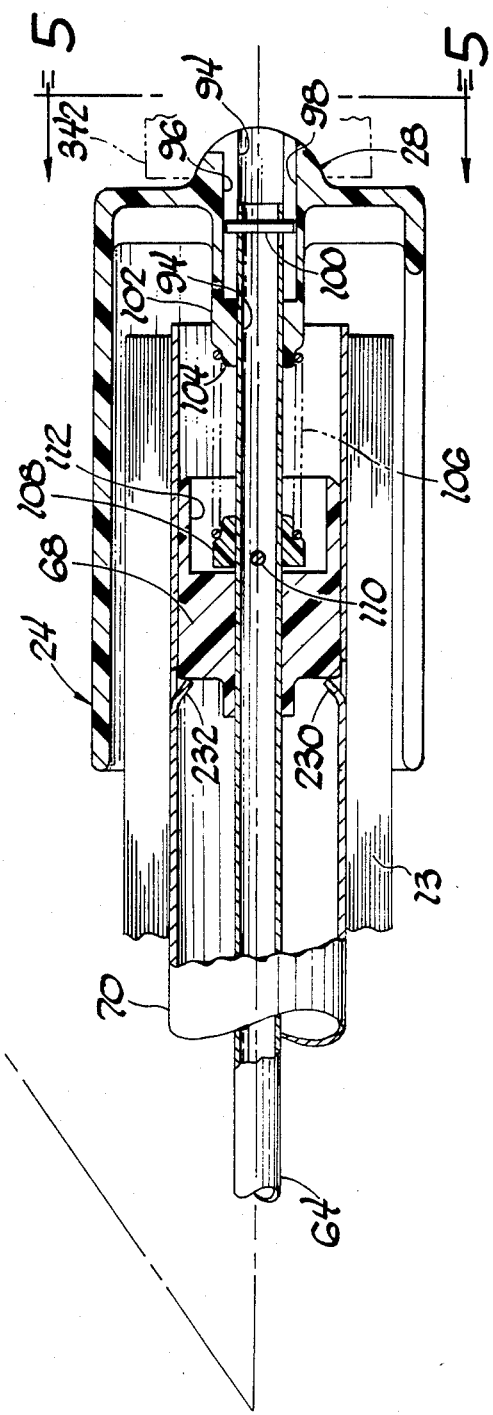
Fig 4

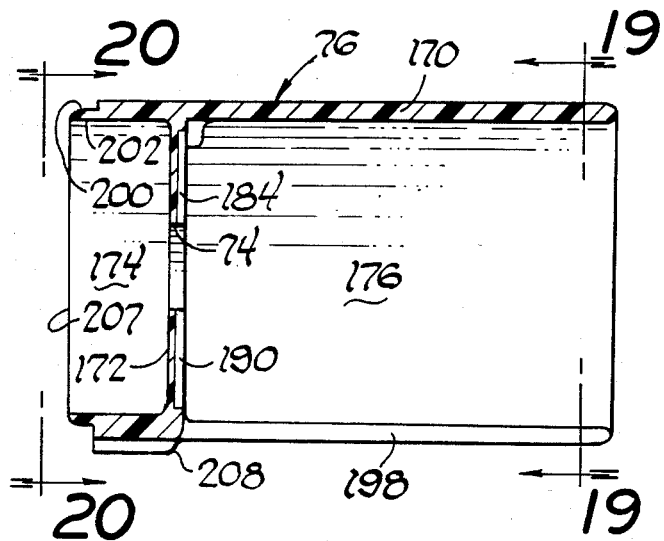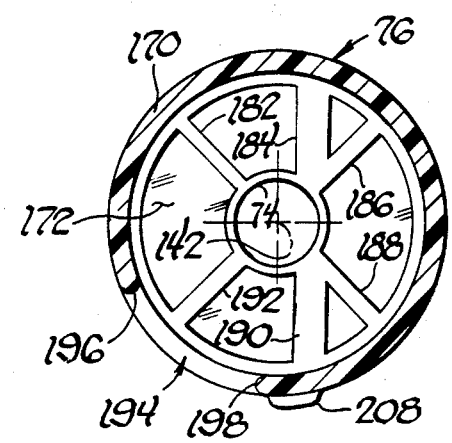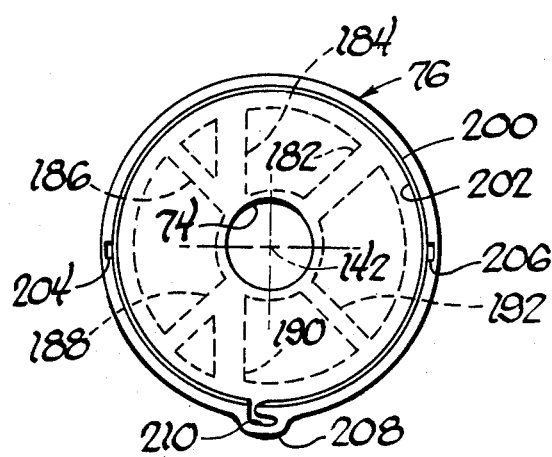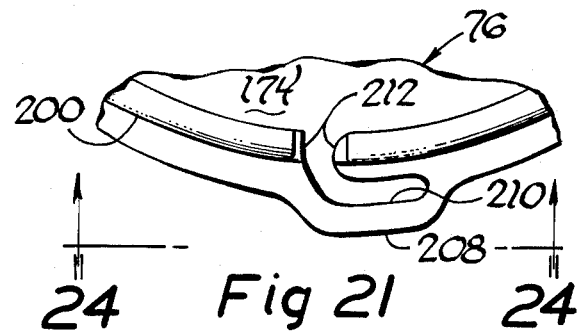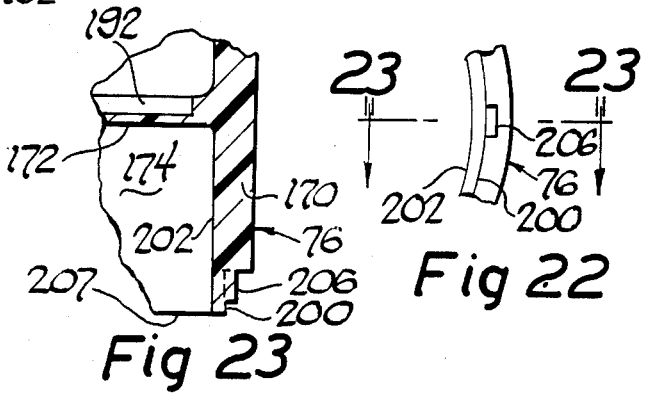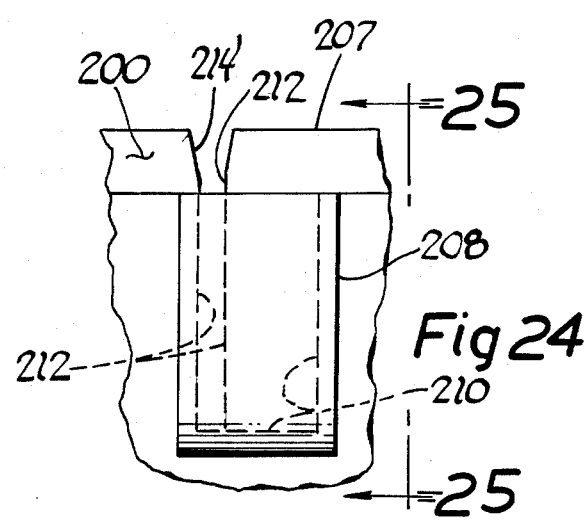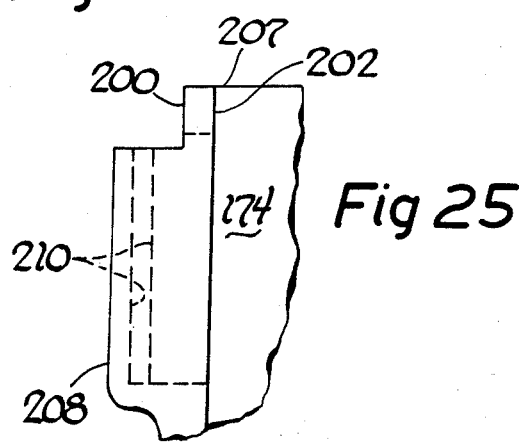

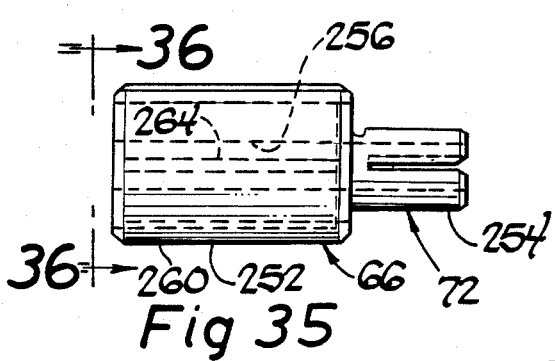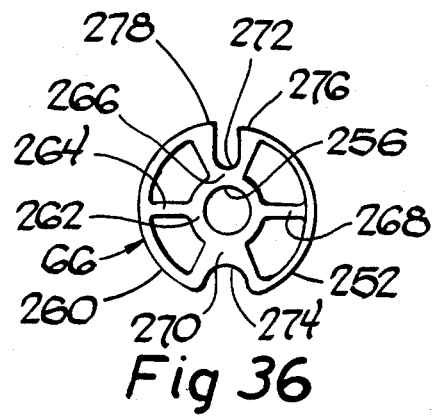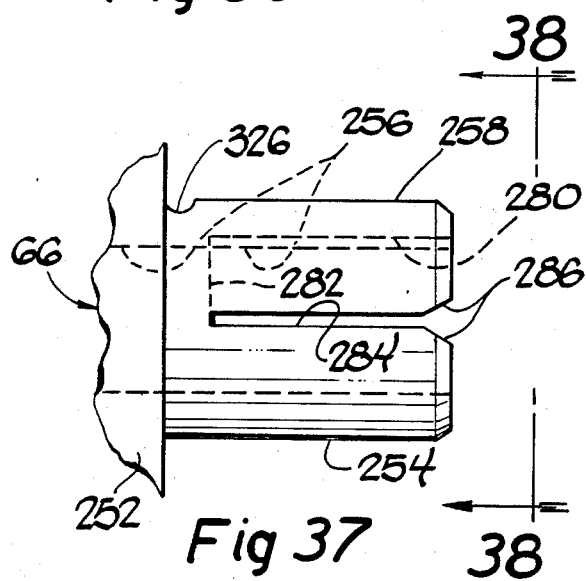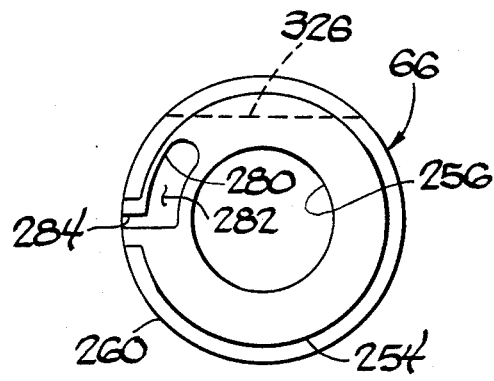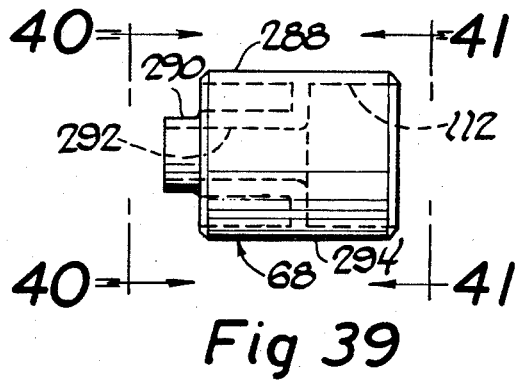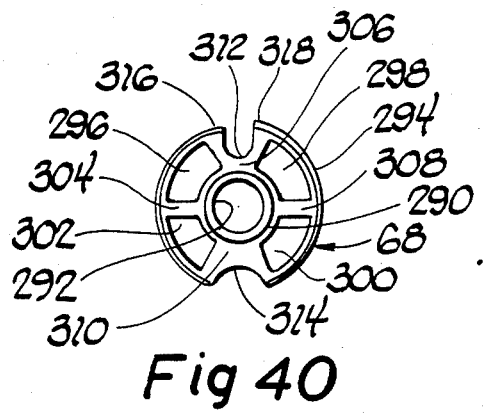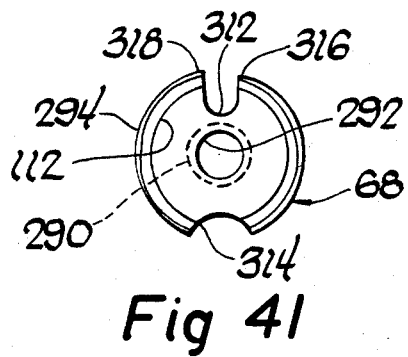

//..

VEHICLE INTERIOR COVER PANEL MEANS

FIELD OF THE INVENTION

This invention relates generally to automotive vehicles and more particularly to cover panel means employed within the vehicle whereby goods carried in the cargo area of the vehicle can be covered as to be kept out of sight.

BACKGROUND OF THE INVENTION AND PRIOR ART STATEMENT

In recent years the design of non-commercial type automotive vehicles has undergone a considerable change. That is, the trend, for the most part, has been, and is now, to eliminate the previously customary fully enclosed vehicular trunk compartment and to, instead, provide an open cargo area within the vehicle. Usually such an open cargo area is located rearwardly of the passenger seats. In vehicles which have two or more tandemly situated passenger seat assemblies it is not unusual to provide for suitable hinging means whereby the back rest portions of the rearwardly situated passenger seat assembly or assemblies may be pivotally swung generally forwardly and downwardly thereby placing the folded seat back in a plane generally extending the cargo support surface of the cargo carrying area.

Further, it has become popular in such vehicles to provide what is commonly referred to as a hatchback door. That is, such a door is usually one situated at the rear of the vehicle and pivotally swingable to and from open positions with the point or centerline of such swingable rotation being relatively high in the general roof structure of the vehicle. Such hatchback doors also contain a window therein with such window serving as the rear window of the vehicle when the hatchback door is closed. The provision of such a hatchback door, usually relatively large and often extending downwardly to the vicinity of the vehicular rear bumper, enables the easy loading and unloading of cargo through the rear of the vehicle.

A significant problem of such vehicles with open cargo areas, especially the hatchback type vehicle, is that whatever cargo is placed in the cargo area such is totally visible to anyone who looks through the vehicle windows. The fact that such cargo is visible adds to or creates the temptation for persons to break into the vehicle and steal such cargo. Such temptation is often given-in-to especially where the cargo is relatively costly as, for example, where the vehicle owner has possibly customized the vehicle by addition of radio speakers or the like in the cargo carrying area. However, the provision of a permanent fixed security panel as a cover in such cargo carrying area would defeat the purpose of such a generally open cargo area and significantly reduce its general utility especially where cargo of relatively large dimensions had to be transported.

The prior art has proposed various structures for functioning as a cover for the cargo within the otherwise open cargo area. For example, U.S. Pat. No. 3,909,060 dated Sept. 30, 1975 issued to Yutaka Katayama, discloses, in FIGS. 1, 2 and 3 thereof, two upstanding stanchions 16 and 17 to which a pair of elastic cords 21—21 are secured as at 23. The respective other ends of such elastic cords 21—21 are secured as at 22—22 to the swingable end of the hatchback door or lid 14. An opaque flexible cover 24 extends from one of the elastic cords 21 to the other elastic cord 21 and is suitably secured thereto. When the hatchback door 14 is closed, the cover 24 and cords 21—21 assume a position as depicted in FIG. 1 and when the door 14 is opened the cover 24 and cords 21—21 assume a position as depicted in FIG. 2. Even though not specifically stated, it is assumed that if cords 21—21 can be secured at points 22—22 such cords 21—21 can also be detached from such points 22—22 if desired in situations where, for example, the size and/or configuration of the cargo possibly would not permit the use of the cover 24. In such event, the cover 24 and cords 21—21 become loose material within the cargo area since there is no provision for any specific storage of the cover assembly 20. FIGS. 4, 5 and 6 of said U.S.A. patent to Katayama discloses an arrangement similar to that of said FIGS. 1, 2 and 3 with the exception that the elastic cords 41—41 and cover 44 are secured at one end to the top 36 of a rearwardly situated second seat assembly 39. Otherwise the operation thereof is the same as that of the embodiment in said FIGS. 1, 2 and 3.

U.S. Pat. No. 4,127,301 dated Nov. 28, 1978, issued to Daniel J. Syrowik (hereinafter referred to as "Syrowik patent"), discloses various cargo cover arrangements. FIGS. 1, 2, 3, 4, 5 and 6 illustrate a rigid shelf-like structure 26 medially hinged as at 64 and provided with pin members 58 respectively received in retainer-like supports 78. The outer periphery, along the sides, is formed as to be closely received within the vehicle and yet have vehicular protrusions such as at 110 and 112 serve to support the rearward end of the cover or panel means 26. Such an arrangement, of course, presents real problems when the cargo to be carried does not fit under the panel means 26. In those situations, the panel means 26 must be removed from the back of the vehicular seat 14, folded along the pivotal axis of hinge means 64 and placed either into the passenger area (if possible) or placed onto the floor of the cargo carrying area thereby itself taking space from the cargo to be carried. FIGS. 7 and 8 of the "Syrowik patent" disclose a structure similar to that of FIGS. 1–6 of the "Syrowik patent" with the exception that the support pins 58—58 are located along the respective sides of the panel means 26 and are respectively received within supports 78 carried by the sides of the vehicle instead of the seat as in said FIGS. 1–6. The problems herein pointed-out with respect to the embodiment of "Syrowik patent" FIGS. 1–6 apply equally well to the embodiment of "Syrowik patent" FIGS. 7 and 8.

FIGS. 9, 10 and 11 of the "Syrowik patent" disclose a rigid cover panel 26 hingedly secured to the rear side of the seat assembly back rest and supported by stops or abutments 154 and 156 respectively carried by opposite interior sides of the vehicle. In this arrangement it is effectively impossible to carry cargo, in the cargo area, which has a height greater than the elevation of the rigid cover panel 26 without first folding the seat assembly back rest to its fully folded position at 14b. If there are passengers needing such seat, the cargo and the passengers cannot be transported at the same time.

FIGS. 12, 13 and 14 of the "Syrowik patent" illustrate a form of cargo cover 26 which may be formed of relatively thin and flexible material and, along three sides thereof, provided with first portions 168 of snap fastener assemblies the second portions 170 of which are carried as by the interior walls of the vehicle and the rear surface of the seat assembly back rest. Such an arrangement is at least somewhat inconvenient to install, generally susceptible to tearing when disengaging the snap fastener assemblies and likely to become damaged as when, for example, cargo is being removed from the cargo area without first removing the thin flexible cover panel 26.

FIGS. 15, 16 and 17 of the "Syrowik patent" illustrate a window-shade type of roller and cover assembly carried as by the seat assembly back rest. The cover 26 has its free end secured, as by detachable hooks, to the swingable end of the hatchback door 18. As in window-shade roller assemblies a spring tends to wind the fabric cover 26 upon the roller assembly 178.

FIG. 18 of the "Syrowik patent" illustrates an arrangement very similar to that of said U.S. Pat. No. 3,909,060 with the exception that the cover panel 26 is rigid and, instead of elastic cords 21, sliding tube support hooks 228 and 230 are provided.

U.S. Pat. No. 4,139,231 dated Feb. 13, 1979, and issued to David Lang et al (hereinafter referred to as the "Lang patent") discloses a cargo cover assembly 10 having a roller tube 20 into which are assembled opposite end assemblies 24 and 26. The end assembly 24 is merely an idler-like assembly whereas end assembly 26 contains a coiled spring 54 which has its inner end secured to an anchored shaft 52 (anchored when installed in the vehicle) and its outer end secured to the roller tube 20. A flexible cover 22 is wound about the roller tube 20 and it is intended that the coiled spring 54 cause rotation of the roller tube to thereby wind the cover 22 onto the roller tube 20 (as when the cover 22 is either detached from the hatchback door 18 or the door 18 is swung shut from the position shown in FIG. 1B of the "Lang patent"). One of the very real problems of this structure is that in order to obtain the necessary functional extension (travel) of the cover 22 and still have sufficient spring force, the diametral size of the end housing 26 must be quite large in order to contain a coiled spring of sufficient capacity. This, in turn, causes the roller tube 20 to also become excessively large in its diameter. Further, the structure of the "Lang patent", as well as others hereinbefore discussed, fail to provide for axial length adjustment of the overall roller-cover assembly as to thereby be capable of being employed within vehicles of differing interior widths.

U.S. Pat. No. 4,168,094 dated Sept. 18, 1979, and issued to Takeo Yagi (hereinafter referred to as the "Yagi patent"), does not disclose any particular spring or associated structure for causing the flexible cover 3 to be wound upon the cover roller or tube 13. In regard to this the "Yagi patent" merely states: "To this end, the take-up shaft 13 should preferably be endowed with a spring bias for the take-up by a torque spring or the like". The "Yagi patent" is primarily directed to providing an end assembly which will enable the effective extension or contraction of the overall axial length of the entire cargo covering assembly. Various embodiments are disclosed in FIGS. 5, 6, 7, 8, 9 and 14 of the "Yagi patent" with the structures of FIGS. 5 and 14 being the same. In the embodiment of FIG. 5 of the "Yagi patent", a relatively short protuberant shaft 17 rotatably supports a tubular roller 13 which, in turn, carries the flexible cover 3. The short protuberant shaft 17 has a cylindrical hollow portion 19 which slidably receives a still shorter support shaft 11 as by an enlarged portion 20. The outwardly projecting end of shaft 11 is made square or the like while the body portion 20 is provided with a lug or key portion 22 slidably received within an axially extending slot 23 in shaft 17. The squared end of shaft 11 and the cooperating key portion 22 and slot 23 are intended to prevent rotation of end portion 15, shaft 17 and the outer barrel 14 relative to the vehicle in which the overall assembly is installed. It is not explained as to how the shaft 11 and body portion 20 are to be received (assembled into) within hollow portion 19 and yet have the lug or key 22 slidably received and contained within slot 23. Further, in the embodiment of FIG. 5 of the "Yagi patent", only shaft 11 is intended to have relative axial movement and therefore the position of end wall 15 is unchanged regardless of the axial position of shaft 11. This, in turn, means that in those situations where the overall assembly is installed in a vehicle and shaft 11 is near or at its maximum extended condition, end wall 15 will be spaced near or at a maximum distance from the juxtaposed interior surface of the vehicle thereby detracting from the aesthetic qualities of the overall assembled combination of vehicle and cargo cover assembly.

FIG. 6 of the "Yagi patent" attempts to disclose structure by which an end wall-like cup shaped member 42 moves axially with an integrally formed support shaft portion 33. An intermediate generally tubular member 38 is intended to operatively interconnect cup shaped member 42 to the outer barrel 36. Lugs, keys or key-abutments 45 and 46, integrally formed with tubular member 38, are intended to be respectively slidably received within closed-ended key or guide slots 43 and 44 formed in the wall of cup shaped member 42. It is not explained as to how lugs or keys 45 and 46 are to be inserted within slots 43 and 44 especially since the outer cylindrical surface of intermediate member 38 is to be closely slidably received within the inner cylindrical surface of cup shaped member 42. Further, as should be apparent, when cup shaped member 42 is at or near its axially fully extended position the amount of contact between intermediate member 38 and cup shaped member 42 is very little thereby resulting in high stress concentrations in such area of contact at least tending to distort the open end of cup shaped member 42 and possibly result in a failure of such sliding joint. An unintentional leaning thereagainst by a person would most probably cause such a failure.

FIGS. 7 and 8 of the "Yagi patent" disclose structure attempting to achieve that intended by the structure of FIG. 6 but without the use of either a spring or lugs and slots as in FIG. 6. That is, in FIGS. 7 and 8, the cup shaped end member 54 is closely slidably received about an intermediate generally tubular member 53 in which is formed a cam-like groove 55. A thumb screw 56, 57 or the like is threadably carried by the cup shaped end member 54 as to have the shank portion 57 thereof within the cam groove or slot 55. It is intended that when the cup like end member 54 is positioned at the desired axial position, relative to intermediate member 53, the thumb screw 56, 57 is tightened against cam surface 55 and thereby locked against axial movement toward the intermediate member 53. Some of the problems of such an arrangement are that the visible screw 56, 57 presents a temptation to those who are not familiar with its purpose often resulting in the loosening thereof and causing the operational disengagement of the entire cargo cover assembly from the vehicle in which it was installed. Further, more often than not, screws and locking systems of this nature are highly susceptible to becoming loosened due to induced vibrations resulting during vehicle operation. When such become sufficiently loosened, the overall cargo cover assembly is in condition for operational disengagement from the associated vehicle.

FIG. 9 of the "Yagi patent" discloses another embodiment attempting to achieve that intended by the structure of FIG. 6. In FIG. 9 a cup shaped end member 59 is threadably engaged with an intermediate generally tubular member 62. The approach, in employing the FIG. 9 embodiment, is to align the support shaft portion 58 with the cooperating bearing support, of the associated vehicle, and to then threadably rotate end cup shaped member 59 until the support shaft 58 is suitably received within the vehicular bearing support. Again, such an arrangement is susceptible to the unauthorized rotation of the end cup shaped member 59 as well as to rotation due to induced vibrations either of which, of course, may lead to the operational disengagement of the overall cargo cover assembly from the associated vehicle.

U.S. Pat. No. 4,222,601 dated Sept. 16, 1980, issued to James E. White et al (hereinafter referred to as the "White patent"), discloses, as a preferred embodiment, a cargo cover assembly which, if accidentally dislodged from its associated vehicular supports, will lock the end members from rotation as to thereby prevent loss of torsional potential energy from the axially extending helically wound torsion spring 68. The structure as generally disclosed in the "White patent" is rather difficult and costly to manufacture and has operational characteristics not best suited for use. More particularly, the take-up spring 68 in the "White patent" is a helically wound axially extending torsion spring which must be fitted about the outer diameter of the centrally disposed main rod 40 and then have one end, of such spring 68, secured to the rod 40 as by rivet 70 or the like. It is known that where a torsion spring such as 68 is provided about a shaft or rod 40 and the spring is to undergo twisting, as to thereby develope or exhibit a resilient force, such a spring will often, if not usually, create noise. In order to reduce such noise, the structure of the "White patent" is provided with tubular members 90 and 92 respectively situated along the outer diameter and inner diameter of the spring 68. Such tubes 90 and 92 are intended to serve as a silencing or damping means with regard to spring 68. The provision of tubes 90 and 92 create problems during assembly of the structure as viewed in FIG. 3 of the "White patent". For example, since spring 68 has an end which extends even beyond the outer diameter of spring 68, it is apparent that the inner tube 92 must be inserted from the left end (as viewed in said FIG. 3) of the helically coiled spring 68. That, in turn, requires that either the spring 68 be first placed about the tube 40 and the inner tube 92 then inserted from the left end as to be between spring 68 and tube or rod 40 or that the buffer tube 92 be first inserted within spring 68 and such a subassembly be then slid onto support tube 40. Only after that can the left end of spring 68 be secured to the support tube 40 as by the rivet 70. Further, since the rivet 70 is generally enclosed by the outer tube 90, such outer tube 90 can be assembled about the outer diameter of spring 68 only after rivet 70 is affixed. The support tube 40, riveted spring 68, and buffer tubes 90 and 92 may then be inserted into the roller tube 20 and the bearing 44 (a portion of which is illustrated at the left end of FIG. 3 of the "White patent") may then be inserted as to both support the left end of roller tube 20 with respect to support tube 40 and to serve as an axial abutment for outer buffer tube 90. Next, the support tube 40 and roller tube 20 must be rotated relative to each other as to place the end 88 of spring 68 in abutting engagement with anchor groove 28. Only thereafter bearing member 42 may be inserted into roller tube 20 and about support tube 40 and slid as to have the longitudinally extending portion (of spring 68), which carries end portion 88, slidably received within either of the cut-out portions 84 or 86 of bearing member 42. All of such sequences of assembly, location and alignment are time consuming and costly.

Another problem associated with the structure of the "White patent" is the action of the helically wound axially extending spring 68. More particularly, spring 68 increases in spring force in direct proportion to its twisting (or unit of deflection). For example, if it takes 0.5 lbs. of force to pull the cover 22 an initial 1.0 foot from its fully "rolled-up" condition, it will take 1.0 lbs. of force to pull the cover 22 an additional 1.0 foot. This, of course, is in addition to the initial preload of spring 68 when the cover 22 is in its fully "rolled-up" condition on roller tube 20. Consequently, as the cover 22 is being pulled-out to cover the associated cargo area and for attachment as to the hatchback door, the force necessary to complete such an operation continually increases and becomes at least uncomfortable if not a definite and burdensome strain.

The invention as herein disclosed and described is directed to an improved cargo area cover assembly which is simple to manufacture, effective in its operation and if not totally eliminating the problems of the prior art, then at least greatly minimizing such.

SUMMARY OF THE INVENTION

According to the invention, a covering appartus for the interior of a motor vehicle comprises axially extending centrally disposed shaft means, first and second bearing means carried by said shaft means and spaced from each other axially along said shaft means, roller tube means supported by said first and second bearing means for rotation about the axis of said shaft means, first and second end cup means respectively operatively connected to said shaft means at opposite ends of said shaft means, resilient means resiliently urging at least one of said end cup means axially of and relative to said shaft means, cover means wound about and carried by said roller tube means, said cover means having a first end operatively secured to said roller tube means and a second end adapted to be pulled as to thereby unwind at least a portion of said cover means from said roller tube means, and recoil spring means carried by at least one of said end cup means and operatively connected to said roller tube means, said recoil spring means being effective to resiliently resist the unwinding of said cover means from said roller tube means with a force which is characterized by a relatively flat torque-deflection curve so that as said unwinding increases the attendant required force increases at a very gradual and non-constant rate over the distance traveled by said cover means during said unwinding.

Various general and specific objects, advantages and aspects of the invention will become apparent when reference is made to the following detailed description of the invention considered in conjunction with the accompanying drawings.

BRIEF DESCRIPTION OF THE DRAWINGS

In the drawings wherein for purposes of clarity certain details and/or elements may be omitted:

FIG. 1 illustrates a motor vehicle such as a station wagon or the like, with portions thereof broken away, employing a vehicular interior cargo panel means employing teachings of the invention with such vehicle having the rear door thereof in a closed condition or position;

FIG. 2 is a view of a motor vehicle as that shown in, for example, FIG. 1, but with the rear door thereof in an opened position;

FIG. 3 is an elevational view of a vehicular interior cargo cover panel means employing the teachings of the invention;

FIG. 4 is a relatively enlarged axially extending cross-sectional view of the cargo cover panel means of FIG. 3;

FIG. 18 is a view of one of the elements shown in FIG. 4;

FIG. 19 is a cross-sectional view taken generally on the plane of line 19—19 of FIG. 18 and looking in the direction of the arrows;

FIG. 20 is an elevational view taken generally on the plane of line 20—20 of FIG. 18 and looking in the direction of the arrows;

FIG. 21 is an enlarged view of a fragmentary portion of the structure shown in FIG. 20;

FIG. 22 is an enlarged view of a portion of the structure shown in FIG. 20;

FIG. 23 is a fragmentary cross-sectional view taken generally on the plane of line 23—23 of FIG. 22 and looking in the direction of the arrows;

FIG. 24 is an elevational view taken generally on the plane of line 24—24 of FIG. 21 and looking in the direction of the arrows;

FIG. 25 is an elevational view taken generally on the plane of line 25—25 of FIG. 24 and looking in the direction of the arrows;

FIG. 35 is an elevational view of one of the elements shown in FIG. 4 rotated generally 180° from the position depicted in FIG. 4;

FIG. 36 is an elevational view taken generally on the plane of line 36—36 of FIG. 35 and looking in the direction of the arrows;

FIG. 37 is an enlarged elevational view of a fragmentary portion of the structure of FIG. 35;

FIG. 38 is a view taken generally on the plane of line 38—38 of FIG. 37 and looking in the direction of the arrows;

FIG. 39 is an elevational view of one of the elements shown in FIG. 4;

FIG. 40 is a view taken generally on the plane of line 40—40 of FIG. 39 and looking in the direction of the arrows;

FIG. 41 is a view taken generally on the plane of line 41—41 of FIG. 39 and looking in the direction of the arrows;

DETAILED DESCRIPTION OF THE PREFERRED EMBODIMENT

Figure 5:
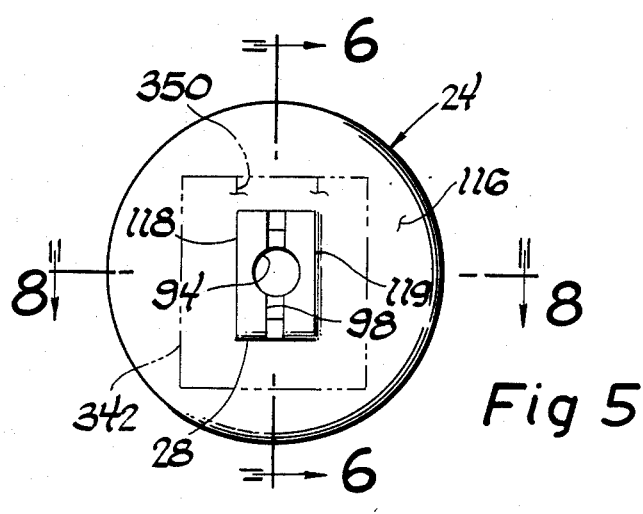
FIG. 5 is an elevational end view taken generally on the plane of line 5—5 of FIG. 4 and looking in the direction of the arrows.
Figure 8:
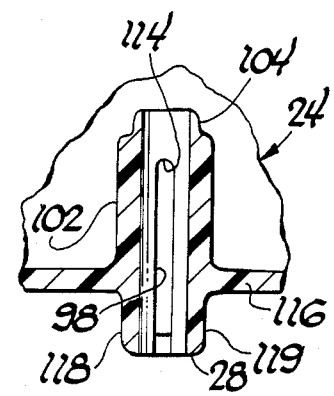
FIG. 8 is a fragmentary cross-sectional view taken generally on the plane of line 8—8 of FIG. 5 and looking in the direction of the arrows.

Referring now in greater detail to the drawings, in FIGS. 1 and 2 an automotive cargo or compartment cover assembly 10 is illustrated as mounted in a station wagon or hatchback bodied automotive vehicle 12 and extended as a cover across the top of the rear compartment 14 of the vehicle 12. In the embodiment of the invention depicted, the cover assembly 10 extends from or near the back of the rear seat 16 of the vehicle 12 and the cover 13 is extended across the rear compartment 14 and suitably attached as at its free end 18 to the swingable hatch or rear door 20 as to be movable therewith.

As best seen in FIG. 2, this manner of attaching the free end 18 of the cover member 13 permits free access into the interior of the rear compartment 14 when the hatch or door 20 is opened. Of course, if desired, the free end 18 of the extendible cover member 13 may, if desired, be suitably secured as to the vehicular trim or other structure at an elevation below the bottom of the hatch of a hatchback door or the like.

As illustrated in somewhat simplified form in FIG. 3, the cover assembly 10 is depicted as comprising a cover member 13 suitably wound onto a cooperating roller-like tube or the like, not shown in FIG. 3, with generally hollow first and second end cups or housings 22 and 24 which are, in turn, preferably provided with extensions 26 and 28 for use in securing the assembly 10 to the interior of the vehicle 12 as by cooperating bearing like supports or means carried by the vehicle 12. FIG. 3, further illustrates the cover member 13 in at least a partly extended condition with its free end 18 being depicted at the generally uppermost portion of FIG. 3.

In the preferred embodiment the end of the cover member 13 is secured to a relatively stiff end board 30 which, in turn, has secured to opposite sides thereof suitable material such as, for example, felt or the like 32 which extends at both sides of the end board 30 to a point or line as at 34 which may be in the order of 0.38 inch beyond the inner end 36 of the end board 30. Such extension of the fabric 32, in turn, contains the end 38 of the cover member 13 and may be fixedly secured to the opposite sides of such cover member 13 by any suitable means as by, for example, heat sealing.

Further, preferably, the outer periphery of the end board 30 is provided with a padded edging material 40 which may be secured to and about the outer edge of end board 30, and the material 32 at opposite sides thereof as by, for example, stitching 42.

The end board 30 is also preferably provided with a first pair of apertures formed therethrough which respectively receive suitable grommets 44 and 46 therein. Each of such grommets may be formed as upper and lower halves, both defining a peripheral outer flange engaging the outermost surface of the material 32, so that upon assembly of such grommets 44 and 46 through the respective cooperating apertures the cooperating halves become secured to each other and thereby define apertures which may respectively receive therethrough hooks or other retainer means 48 and 50 carried as by the hatchback door or at some other structure of the vehicle.

Figure 26:
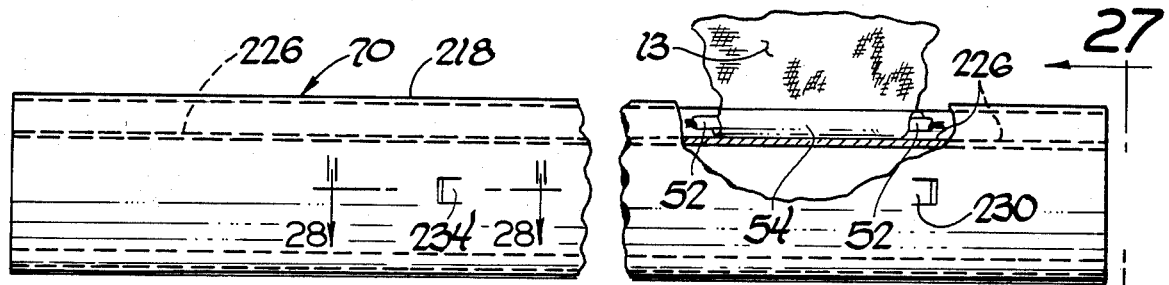
FIG. 26 is an elevational view of one of the elements, with a portion thereof broken away, shown in FIG. 4.

The other end of the cover member 13 may be effectively wrapped as about a boltrope 52 and that portion of the cover member 13 may be effectively secured thereto by any suitable means such as, for example, stitching. A fragmentary portion of the boltrope, or the like, 52 is illustrated in FIG. 26 with the cooperating end of the cover member 13 being generally wound thereabout as at 54 and suitably secured as to retain the boltrope 52 in a generally enveloped condition.

Referring again in particular to FIG. 3, in the preferred embodiment the end board 30 is also provided with a second set of openings formed therethrough which respectively accommodate handles 56 and 58 each formed as to have upper and lower disposed sides with generally circumscribing flanges so that when such handles are assembled to the end board 30 the flanges circumferentially define respective openings 60 and 62 into which a person's hands or fingers may be inserted as to pull the cover member 30 in a direction away from its rolled-up condition or, if the situation is such, yieldingly restrain the movement of the cover member 30 as it is moving toward its rolled-up condition.

Referring to FIG. 4 it can be seen that, generally, the cargo or compartment cover assembly 10 is comprised of a longitudinally extending center shaft or tube 64 which at its left end, as viewed in FIG. 4, is provided with what may be referred to as a drive hub or bearing 66 and which, at its right end, is provided with what may be referred to as a driven hub or bearing 68. Both hubs 66 and 68 are freely rotatable with respect to the center shaft 64.

The hubs 66 and 68, in turn, cooperate to support an axially extending roller tube 70 (which will be subsequently described in further detail) which, in turn, functions to operatively carry and have rolled on to it the flexible cover material 13. As generally depicted, the drive hub or bearing 66 has a generally cylindrical extension 72 of comparatively reduced diameter and such is rotatably received through a central aperture 74 of a generally tubular shield portion 76 comprising a portion of the overall end cup or housing 22. The shaft 64 extends into a receiving aperture or passage 78 formed in a cooperating end cap member 80 and is axially and angularly secured therein as by a roll pin 82 or the like fitted into a cross-passage 84 formed in end cap member 80 and cooperating passage or aperture means 88 and 90 formed in center shaft 64. As will become apparent, if not so already, the pin 82 serving to lock the center shaft 64 to end cap 80 results in such end cap 80 being operationally held against the juxtaposed end of tubular shield member 76. In the preferred embodiment, both cap member 80 and tubular shield member 76 are comprised of polycarbonate.

The annular space generally about cylindrical extension 72 and within the juxtaposed outer confines of the tubular shield serves to accommodate a return spring 92 which, in the preferred embodiment, comprises a pre-stressed recoil spring.

Referring primarily to the right end of FIG. 4, the right end of the central shaft 64 slidably extends through a central aperture or passage 94 formed in the cup-like or tubular means 24 which is also provided with axially extending opposed slot or groove means 96 and 98. A cross pin 100 retained within cooperating apertures formed in center shaft 64 extends beyond the diameter of shaft 64 and is free to slide within guide grooves or slots 96 and 98 while simultaneously preventing the otherwise free rotation as between shaft 64 and the housing means 24. In the preferred embodiment the end housing means 24 is comprised of polycarbonate and comprises an inwardly directed axially extending portion 102 which provides for the passage 94 and an end portion 104 of reduced diameter serving as a spring seat for one end of a coiled compression spring 106 situated generally about the center shaft 64 and having its other end seated against a spring stop 108 which is precluded from axial movement to the left (as viewed in FIG. 4) by a stop pin 110 carried by the center shaft 64. As depicted, the spring stop 108, pin 110 and a portion of spring 106 may be received generally within a cylindrical enlarged recess or cavity 112 formed in the idler hub or bearing 68.

Figure 6:
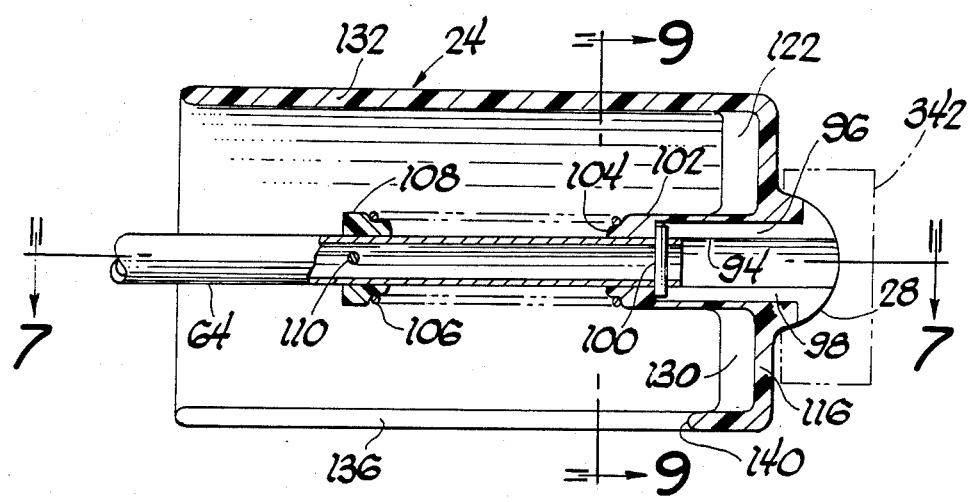
FIG. 6 is a fragmentary cross-sectional view taken generally on the plane of line 6—6 of FIG. 5 and looking in the directions of the arrows.
Figure 7:
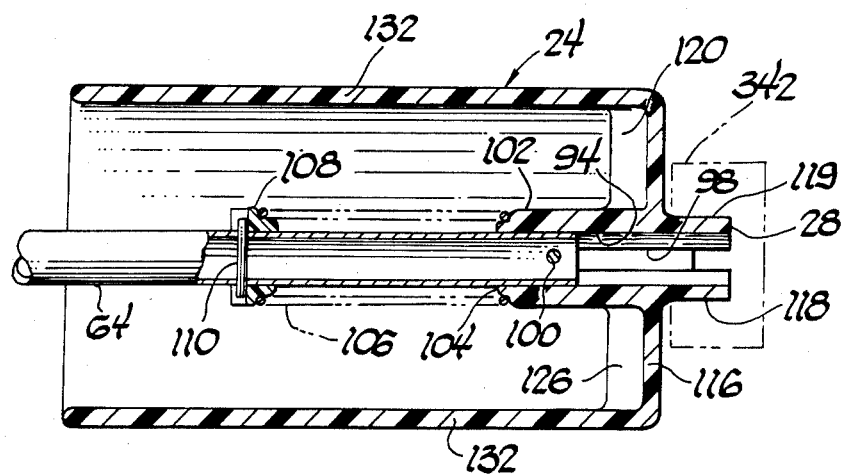
FIG. 7 is a fragmentary cross-sectional view taken generally on the plane of line 7—7 of FIG. 6 and looking in the direction of the arrows.
Figure 9:
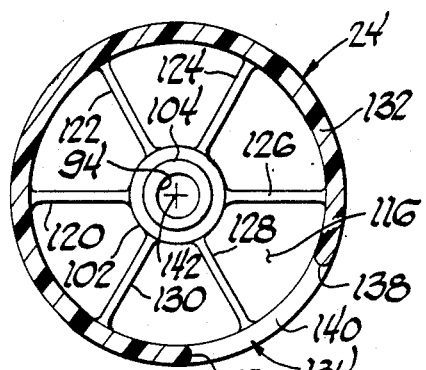
FIG. 9 is a cross-sectional view taken generally on the plane of line 9—9 of FIG. 6 and looking in the direction of the arrows.

Referring in greater detail to FIGS. 5–9, it can be seen, as in FIG. 5, that the preferred embodiment of the end housing means 24 is of cylindrical or cup-shaped configuration having a transverse end wall 116 which, preferably generally externally thereof carries the or an extension portion 28 and, as previously indicated, internally thereof an axially extending projection 102. Although such may be of any suitable configuration, in the preferred embodiment projection 28 has oppositely disposed flat sides 118 and 119 for the slidable reception thereof in cooperating bearing support means carried by the associated vehicle. Further, as best seen in FIGS. 6, 7 and 9, a plurality of internally situated radially extending reinforcing ribs 120, 122, 124, 126, 128 and 130 are provided as to effectively join the end wall 116 to the internal projection 102 as well as the tubular body portion 132 of the end cup means 24.

As best depicted in FIGS. 6 and 7, spring 106 continuously resiliently urges the end cap or housing means 24 to the right with respect to the spring stop 108 and such relative movement continues until the cross-pin or abutment pin 100 abuts against the end surfaces 114 (FIG. 8) of the axial grooves or slots 96 and 98. When such occurs, the various elements assume the respective positions depicted in FIGS. 6 and 7. The spring stop 108, of course, cannot move further to the left relative to center shaft 64 because of the abutment means or pin 110.

In the preferred embodiment, a portion of the cylindrical wall portion 132 of the end housing means 24 is formed to provide an axially extending opening through which the flexible cover member 13 is drawn outwardly or permitted to move inwardly as to be rolled upon the roller tube 70 (FIG. 4). More particularly, with reference to FIGS. 6 and 9, such opening 134 is defined by generally angularly spaced edges 136 and 138 extending generally longitudinally and terminating in an end wall 140. Further, preferably, the opening 134, as viewed in FIG. 9, forms an angle in the order of 58° as between respective planes tangent to edges 136 and 138 and passing through the axis 142 of the end housing means 24.

Figure 11:
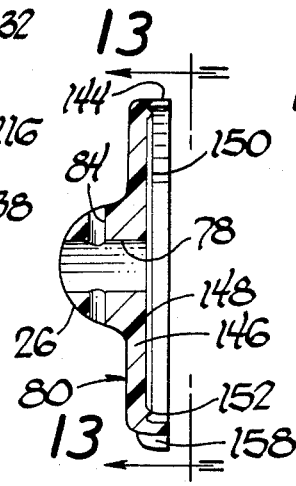
FIG. 11 is a cross-sectional view taken generally on the plane of line 11—11 of FIG. 10 and looking in the direction of the arrows.
Figure 10:
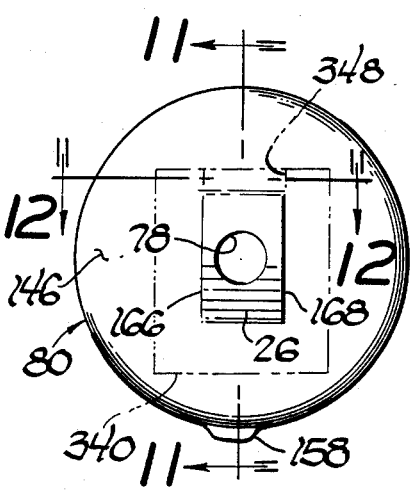
FIG. 10 is an end elevational view taken generally on the plane of line 10—10 of FIG. 4 and looking in the direction of the arrows.
Figure 12:
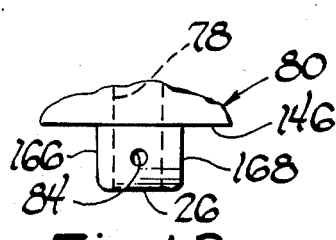
FIG. 12 is a fragmentary elevational view of a portion of the structure shown in FIG. 10 and taken generally on the plane of line 12—12 of FIG. 10 and looking in the direction of the arrows.

Referring now in greater detail to FIGS. 10, 11, 12, 13, 14, 15, 16 and 17, it can be seen that the end cap or end wall means 80 of the end housing means 22 (FIG. 4) is of disk-like configuration having a peripheral wall 144 extending generally axially of the entire assembly 10 and transversely of the main disk-like body 146. As shown in FIG. 11 and in enlarged form in FIG. 15, the inner transverse or end surface 148 of end cap member 80 is provided with a ring-like portion 150 which when viewed in axial cross-section is of generally triangular configuration as depicted, for example, at 152 of FIGS. 11 and 15.

Figure 14:
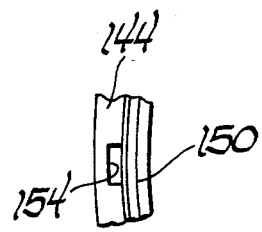
FIG. 14 is an enlarged elevational view of fragmentary portion of the element as shown in FIG. 13.
Figure 13:
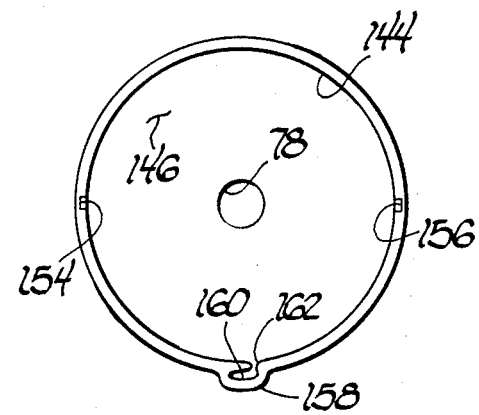
FIG. 13 is an elevational view taken generally on the plane of line 13—13 of FIG. 11 and looking in the direction of the arrows.
Figure 15:
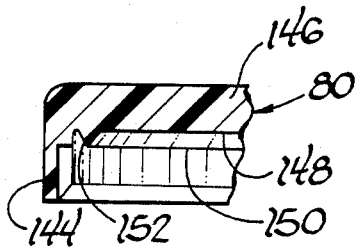
FIG. 15 is an enlarged view of a fragmentary portion of the structure in FIG. 11 with such view rotated 90° from the position shown in FIG. 11.
Figure 16:
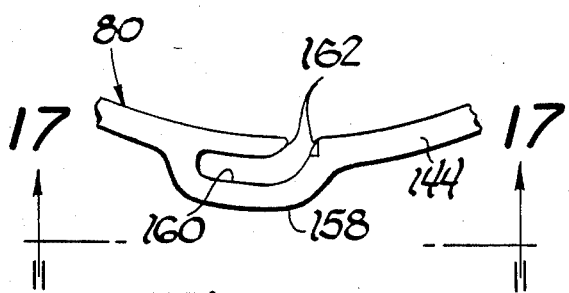
FIG. 16 is an enlarged view of a fragmentary portion of the structure of FIG. 13.
Figure 17:
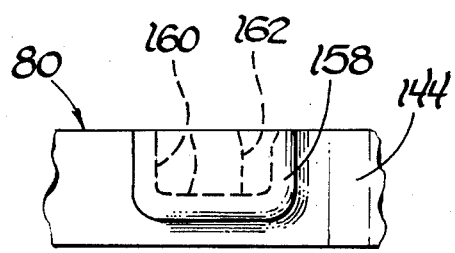
FIG. 17 is a view taken generally on the plane of line 17—17 of FIG. 16 and looking in the direction of the arrows.

As seen in FIGS. 13 and 14, a pair of recesses or notches 154 and 156 are formed in the wall 144, at the inner side thereof, and, as will be seen such cooperate with key-like portions carried by the tubular body 76 of end housing means 22.

As shown in each of FIGS. 10, 11, 13, 16 and 17, the outer wall 144 of end cap member 80 is also provided with a generally radially outwardly extending protuberance 158 in which, in turn, is formed a generally axially extending somewhat curvilinear slot 160 which has an end 162 opening into the interior of the confines of outer wall 144.

The end cap 80 is also preferably provided with a generally axially extending outwardly directed projection 26 through which the passages 78 and 84 are formed. Although such may be of any suitable configuration, in the preferred embodiment projection 26 has oppositely disposed flat sides 166 and 168 for the slidable reception thereof in cooperating bearing support means carried by the associated vehicle.

Referring in greater detail to FIGS. 18, 19, 20, 21, 22, 23, 24 and 25, the generally tubular member 76, comprising a portion of the end housing assembly 22, is depicted as being of generally cylindrical tubular configuration having a cylindrical wall 170 with an internally disposed transversely extending wall 172 in which the said passage 74 (FIG. 4) is formed. The wall 172 might be considered as generally separating or defining two chambers 174 and 176, at opposite sides thereof, within the generally tubular member 76. In the preferred embodiment a plurality of generally radiating ribs or struts 178, 180, 182, 184, 186, 188, 190 and 192 are integrally formed with wall 172 as reinforcing means therefor.

In the preferred embodiment, a portion of the cylindrical wall portion 170 of the cylindrical member or shield 76 is formed to provide an axially extending opening through which the flexible cover member 13 is drawn outwardly or permitted to move inwardly as to be rolled upon the roller tube 70 (FIG. 4). More particularly, with reference to FIGS. 18 and 19, such opening 194 is defined by generally angularly spaced edges 196 and 198 extending generally longitudinally and terminating as at wall 172. Further, preferably, the opening 194, as viewed in FIG. 19, forms an angle in the order of 58° as between respective planes tangent to edges 196 and 198 and passing through the axis 142 of the end housing means 22.

With particular reference to FIGS. 18, 20, 22 and 23, the left end of the tubular member 76, wherein the chamber 174 is generally defined, the cylindrical wall 170 is formed of a reduced outer diameter as to thereby define a smaller cylindrical outer surface 200 so that the thickness of the wall section at such area, that is as between outer cylindrical surface 200 and the inner cylindrical surface 202 of chamber 174 is considerably less than the cross-sectional thickness of the remaining portion of the cylindrical member 76. Further, as best seen in FIGS. 20, 22 and 23, a pair of lugs, locators or key-like members or portions 204 and 206 are carried as by reduced cylindrical surface 200 and extend, preferably, to almost the axial end 207 of the tubular member 76.

As shown in each of FIGS. 18, 19, 20, 21, 24 and 25, the cylindrical wall 170 in the region of the cavity or chamber 174 is also provided with a generally outwardly extending protuberance 208 in which, in turn, is formed a generally axially extending somewhat curvilinear slot 210 which has an end 212 opening into the interior of the confines of the chamber or cavity 174. Further, as best seen in FIGS. 24 and 25, the opening 212 extends through the end portion 200 of reduced diameter and is preferably provided with a flared-like end 214.

Figure 27:
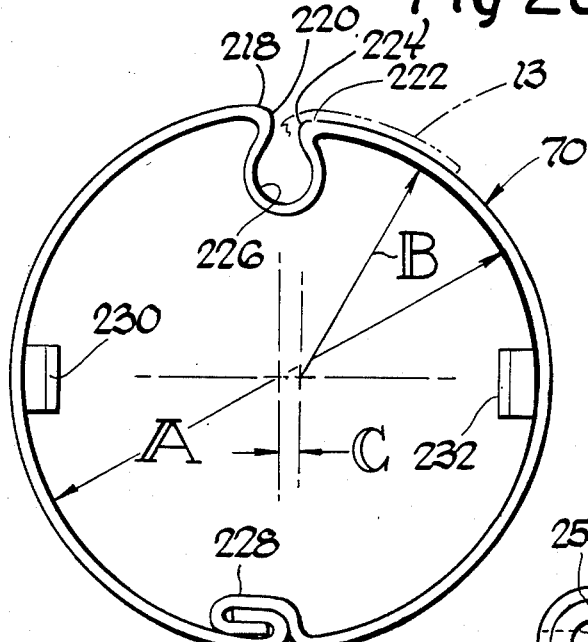
FIG. 27 is an enlarged elevational view taken generally on the plane of line 27—27 of FIG. 26 and looking in the direction of the arrows.
Figure 28:
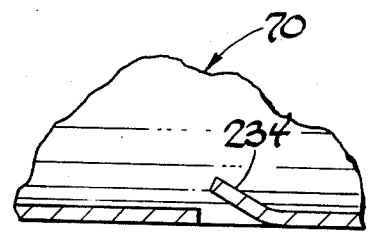
FIG. 28 is an enlarged cross-sectional view of a fragmentary portion of the structure of FIG. 26 taken generally on the plane of line 28—28 of FIG. 26 and looking in the direction of the arrows.

Referring now in greater detail primarily to FIGS. 26, 27 and 28 as well as to FIG. 4, in the preferred embodiment the roller tube 70, which is preferably comprised of steel, is formed as by rolling to assume an almost totally cylindrical configuration. That is, more particularly with reference to FIG. 27, and by way of example, in the preferred embodiment the roller tube 70 is formed as to have its inner diameter, A, for the most part of a dimension in the order of 1.135 inches. However, offset along its diameter, as by a distance, C, in the order of 0.04 inch, a portion of the roller tube 70 is rolled or formed as to have an inner radius B of a dimension in the order of 0.52 inches which, as depicted, effectively blends into the diameter A. Consequently, the outer most surface 218 of the longitudinal bend 220 is displaced in the order of 0.095 inch radially outwardly of the outer most surface 222 of the longitudinal bend 224. The bend portions 220 and 224 continue generally radially inwardly to form a generally curvilinear groove or recess 226 which extends the length of the roller tube 70 and such groove or recess defines what may be referred to as an anchor groove for operatively retaining therein one end of the cover member 13. The longitudinally extending space between the bend portions 220 and 224 permits the passage or extension therethrough of the cover member 13.

As generally fragmentarily depicted in FIG. 26, the end 54 wrapped about and secured to the boltrope 52 are slid into the roller anchor groove or means 226 and effectively frictionally retained therein while the remainder of the cover member 13 extends through the clearance slot between bends 220 and 224. The rolled-formed tube 70 is completed as by a rolled seam 228 which may be disposed diametrically opposite to the anchor groove 226.

A first pair of tabs or abutments 230 and 232 are struck in the roller tube 70 as near the right end thereof, as viewed in either FIGS. 4 or 26, while a second pair of tabs or abutments 234 and 236 are struck in the roller tube 70 as near the left end thereof.

As the cover member 13 is wound upon the roller tube 70, the cover member 13 is first wound in a direction as fragmentarily depicted in phantom line at 13 of FIG. 27 thereby having the thickness of the cover member 13 effectively "make-up" the difference between the radial distances of surfaces 218 and 222 and thereby result in a more uniform operating diameter as the roller tube 70 is being rotated to either wind upon itself, or unwind from itself, the cover member 13. This, of course, eliminates the sudden jerking-like feel on the cover member 13 during rotation of the tube 70 as would occur if the outer diameter of the roller tube 70 were of constant diameter as in the prior art.

Figures 29, 30:
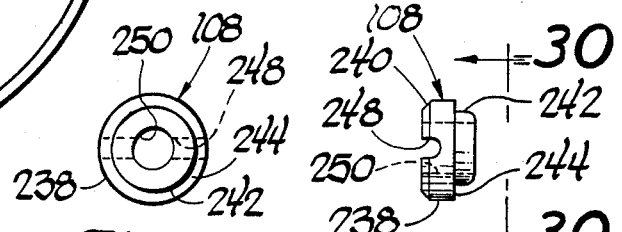
FIG. 29 is an elevational view of one of the elements shown in FIG. 4.
FIG. 30 is a view taken generally on the plane of line 30—30 of FIG. 29 and looking in the direction of the arrows.
Figure 31:
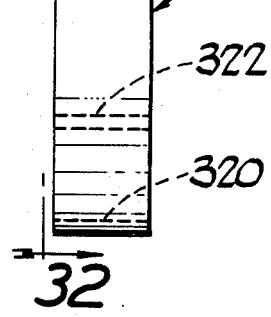
FIG. 31 is an elevational view of one of the elements shown in FIG. 4.

FIGS. 29 and 30 illustrate the spring stop 108 as comprising a main body portion 238 of generally cylindrical configuration which, at one end may be chamfered as at 240 and at the other end is provided with a cylindrical extension 242 of relatively reduced diameter as to thereby define an annular radiating flange 244. As depicted in FIG. 4, the extension 242 serves as a pilot for one end of the spring 106 while the flange 244 serves as the seat for the same end of the spring 106. A groove or recess 248 is formed in and across the left end of the spring stop 108 (as viewed in FIG. 29) as to be situated diametrically thereacross. An axially extending passage 250 extends through the spring stop 108 and slidably accepts the central rod or tube 64 (FIG. 4) therethrough while permitting the recess or groove 248 to accept the stop pin 110 (FIG. 4).

Referring to FIGS. 35, 36, 37 and 38, the drive bearing or hub 66, preferably comprised of acetal resin, is depicted as being of generally cylindrical configuration having a relatively larger axially extending main body portion 252 and an axially extending relatively short extension 254 of a cylindrical diameter smaller than that of body portion 252. A passage 256 formed through the drive hub 66 slidably receives the center tube or rod 64 therethrough (FIG. 4). The outer diameter 258 of extension 254 is freely rotatably received through aperture 74 of wall 172 (FIG. 4) while the outer diameter 260 of main body portion 252 is freely received within the inner diameter of the roller tube 70 (FIG. 4). In the preferred embodiment, the main body portion 252 is formed as to be at least somewhat hollow in that a generally centrally located core-like body 262 has the passage 256 formed therethrough while a plurality of generally radiating struts or arms 264, 266, 268 and 270, which extend axially along body portion 252, serve to interconnect such core portion 262 with the radially outer portion of the main body 252.

A generally U-shaped longitudinally extending slot 272 is formed generally in the strut or arm 266 as to extend the length of the main body 252. The width of the slot 272 is sufficient to closely accept the outer width of the anchor groove 226 (FIG. 27) while a second groove or recess 274 is similarly formed in strut or arm 270 which is of a size sufficient to closely accept the seam portion 228 (FIG. 27) of the roller tube 70.

Even though the diameter of the main body portion 252 is substantially constant, it should be pointed-out that similar to the slight variation in radius of roller tube 70, as depicted in FIG. 27, so, too, drive hub main body 66 preferably has a slight variation in radius so that the point 276 (as viewed in FIG. 36), and the area immediately clockwise thereof, is of a slightly lesser radius than point 278 and the area counter-clockwise thereof. Such differing radii blend with each other in the manner described with reference to FIG. 27 so that upon assembly the drive hub or drive bearing 66 will be closely received within roller tube 70.

As best seen in FIGS. 37 and 38, the extension 254 has an arcuate recess or cavity 280 extending longitudinally of portion 254 and terminating as at 282. A slot 284, also extending longitudinally of portion 254 serves to interconnect the cavity or recess 280 to the exterior of cylindrical portion 254. The slot 284 is preferably provided with a chamfered end opening 286.

Referring in greater detail to FIGS. 39, 40 and 41, as well as to FIG. 4, the idler hub or bearing 68, which is preferably comprised of acetal resin, is depicted as being comprised of a generally cylindrical, relatively elongated, main body portion 288 which carries at its left end, as viewed in FIG. 39, a cylindrical extension 290. A centrally formed passage 292 permits the free reception therethrough of center shaft 64 (FIG. 4). The passage 292, as illustrated communicates with the relatively diametrically enlarged chamber or cavity 112. The outer diameter 294 of the main body portion 288 is freely received within the inner diameter of the roller tube 70 (FIG. 4). In the preferred embodiment, the main body portion 288 is formed as to be somewhat hollow as by a plurality of recesses 296, 298, 300 and 302 which, in turn, cooperatively define a plurality of generally radiating struts or arms 304, 306, 308 and 310.

A generally U-shaped longitudinally extending slot 312 is formed generally in the strut or arm 306 as to extend the length of the main body portion 288. The width of the slot 312 is sufficient to closely accept the outer width of the anchor groove 226 (FIG. 27) while a second groove or recess 314, similarly formed in strut or arm 310, is of a size sufficient to closely accept the seam portion 228 (FIG. 27) of the roller tube 70. Even though the diameter of the main body portion 288 is generally constant, it should be pointed-out that similar to the slight variation in radius of roller tube 70, as depicted in FIG. 27, so, too, idler hub or bearing body 288 preferably has a slight variation in radius so that the point 316 and the area immediately counter-clockwise thereof (as viewed in FIG. 40) or clockwise thereof (as viewed in FIG. 41), is of a slightly lesser radius than point 318 and the area immediately clockwise thereof (as viewed in FIG. 40) or counter-clockwise thereof (as viewed in FIG. 41). Such differing radii blend with each other in the manner described with reference to FIG. 27 so that upon assembly the idler hub or bearing 68 will be closely received within roller tube 70.

Figure 33:
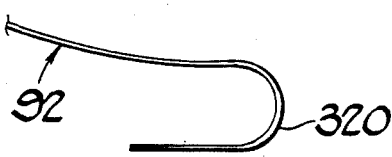
FIG. 33 is an enlarged view of a fragmentary portion of the structure shown in FIG. 32.
Figure 34:
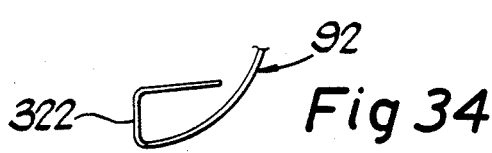
FIG. 34 is an enlarged view of a fragmentary portion of an other section of the structure shown in FIG. 32.

Referring now to FIGS. 31, 32, 33 and 34 in conjunction with FIGS. 4, 18, 21, 24 and 25, a coiled return spring means 92 is shown within the chamber 174 (FIGS. 4 and 18) and is provided with formed ends 320 and 322 (respectively FIGS. 33 and 34). As the return spring means 92 is placed about the projection 72 and axially moved therealong, the inner end 322 of the spring means 92 is received, through slot 284, in chamber or recess 280 (FIGS. 37 and 38) while the outer end 320 of spring means 92 is received, through slot or opening 212, in recess or cavity 210 (FIGS. 20, 21, 24 and 25) thereby anchoring such spring ends to relatively rotatable elements 22 and drive means 66.

The apparatus 10 may be assembled in any number of ways or steps. The following is presented merely by way of example to illustrate at least one way in which the various elements herein disclosed may be assembled. That is (referring primarily to FIG. 4), first the stop or abutment pin 110 may be inserted into center or support shaft means 64 followed by sliding the spring stop means 108 onto shaft 64 and next followed by placing the spring 106 about shaft 64. The end housing or shield means 24 may then be placed onto shaft 64 and moved against spring 106 as to compress spring 106 to the degree that the right end of shaft 64 (as viewed in FIG. 4) extends beyond extension portion 28 and exposes the transverse apertures or passages in shaft 64 for receiving pin or key means 100. At that time the pin means 100 may be inserted into shaft 64 and, upon alignment of the pin means 100 with guide or keyway slots 96 and 98, the housing or shield means 24 may be returned to the right thereby effectively resulting in a sub-assembly of such elements as generally depicted in FIG. 6.

Next, the flexible cover member 13 may be secured to the roller tube 70 as by sliding the captive boltrope 52 and fabric portion 54 (FIG. 26) into the cover member anchor slot or recess 226 (FIGS. 26 and 27) and winding the cover member 13 onto and about the roller tube 70 in the direction generally depicted in FIG. 27. The idler bearing or hub means 68 may then be suitably angularly aligned with and axially inserted into the open end of the roller tube 70 until the left end (as viewed in FIG. 4) of the bearing means 68 abuts against the abutment tabs or means 232 and 234.

Thereafter, the previously described sub-assembly of FIG. 6 may be, in effect, assembled to the described sub-assembled roller tube 70, cover member 13 and bearing means 68 by merely sliding the shaft 64 (from the right as viewed in FIG. 4) through passage 292 (FIG. 39) of bearing means 68.

Following this the drive hub or drive means 66 (FIGS. 4, 18 and 35), is axially inserted into the tubular member 76 as to have extension 72 pass through passage or opening 74 in member 76 as to assume a position as generally depicted in FIG. 4. The recoil spring means 92 may then be assembled, as in the manner herein previously described, and the end cap member 80 assembled onto the open end of tubular member 76. In assembling the end cap member 80, such must be angularly rotated or positioned until: (a) the outer end 320 of recoil spring 92 is also received in the recess 160 of end cap member 80 and (b) keys or projections 204 and 206 (FIG. 20) of the tubular member 76 are respectively received in cooperating slots or recesses 156 and 154 (FIG. 13) of end cap member 80. When such alignment is achieved, the end 207 (FIG. 18) of the tubular member 76 is placed against the juxtaposed annular portion 150, which serves as a heat concentrator, and the end cap member 80 is sonically welded to the tubular member 76 thereby creating a unitary end housing means 22.

Preferably the drive means or drive hub 66 is relatively rotated about three turns to thereby preload the recoil spring means 92 and such preload may be maintained by any suitable means as, for example, insertable locking pin means inserted through appropriate passage means as in the tubular member 76 and to engage a groove 326 or other flatened area on the drive means 66 as generally depicted in FIGS. 37 and 38.

Subsequently, the sub-assembly comprised of the end housing means 22, recoil spring means 92 and the drive hub means 66 are assembled to the left end (as viewed in FIG. 4) of the roller tube 70 as by passing the center shaft 64 through passage 256 of drive means 66, angularly positioning the drive means 66 relative to the roller tube 70 and then moving the drive means 66 (along with all the other elements comprising its sub-assembly) to the right (as viewed in FIG. 4) until the drive means abuts against the tab or abutment means 236 and 234. At that time passage 84 in extension 26 is brought into alignment with passages or apertures 88 and 90 of center shaft or rod 64 and the locking pin 82 is inserted as generally depicted in FIG. 4.

OPERATION OF THE INVENTION

The cover assembly 10 of the invention may be operatively secured as between any two walls of the vehicle, or to the back of the rear seat 16, or even as to the ceiling of a van type vehicle. In any event, the vehicle 12 is provided with suitable support or load bearing means, as generally depicted in phantom line at 340 and 342 (FIGS. 4, 5, 6, 7 and 10) respectively carried internally of the vehicle 12 as by, for example, opposed side walls 344 and 346 of said vehicle.

In the embodiment disclosed, the end extensions 26 and 28 are each flatted as are the sockets or receiving slots 348 and 350 of support means 340 and 342. Therefore, when the cover assembly 10 is assembled to the vehicle 12 and extension or projections 26 and 28 are respectively received by the slots 348 and 350 relative rotation is precluded as between end housing means 22 and the vehicle as well as relative rotation as between end housing means 24 and the vehicle.

The interior widths, between opposite side walls, of all vehicles is, of course, not the same. Therefore, it is to be expected that the distance between opposite support means 340 and 342 will also vary as between vehicles. (This, of course, also applies to situations where the support means 340 and 342 may be carried by the back of the rear seat 16 or even where such support means 340 and 342 may be carried as by the ceiling of a van type vehicle.) The invention as herein disclosed provides means for accommodating such varying distances between opposite support or bearing means 340 and 342. Such can best be understood by reference to FIGS. 4, 6 and 7. More particularly, it can be seen in FIGS. 6 and 7 that spring 106 will normally urge end housing or cup means 24 to the right with such movement being with respect to the fixed abutment pin 110. Therefore, when the elements assume positions as depicted in either FIGS. 6 or 7, the cover assembly 10 attains a maximum axial length. However, as previously herein described, housing means 24 may be moved axially to the left as to thereby correspondingly compress spring means 106. FIG. 4 illustrates a condition wherein the housing means 24 has been moved to the left for a distance which is only a part of its available axial inward travel. This, of course, results in the cover assembly having an axial length somewhat less than its previously described maximum axial length and still of an axial length greater than its attainable minimum axial length which would occur if the end housing means 24 were moved a distance so that pin 100 would closely approach or effectively be at the outer most portion of the guide or key slots 96 and 98 of extension or projection 28. Accordingly, it can be seen that the invention has the ability to accommodate for varying distances between opposite bearing means 340 and 342 and that such accommodation is generally equal to the effective axial length of key slot means 96 and 98.

Figure 32:
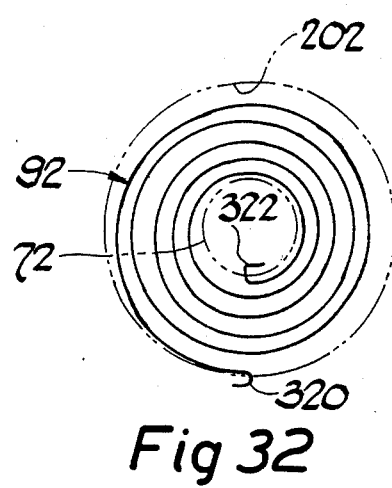
FIG. 32 is a view taken generally on the plane of line 32—32 of FIG. 31 and looking generally in the direction of the arrows.

Once the cover assembly 10 is thusly suitably secured or attached to support means 340 and 342, the cover member 13 may be grasped as by handles 56 and 58 (FIGS. 1, 2 and 3) and pulled in a direction away from the remainder of assembly 10, with such cover member passing through the openings 194 (FIG. 19) and 134 (FIG. 9) of end housing or shield means 22 and 24, respectively. When the cover member 13 has thusly been sufficiently extended, the hooks or retainers 48 and 50, which may be carried by the hatchback door 20, may be engaged with eyelets 44 and 46 of the cover member 13 as generally depicted in FIG. 2. During the process of extending the cover member 13, and securing it to retainers 48 and 50, the roller tube 70, which is secured to the cover member 13 (as via boltrope means 52, FIG. 26), undergoes rotation causing the drive hub means 66 (FIG. 4) to rotate in unison therewith. As previously described, the projection 72 of drive means 66 is operatively connected to the inner end 322 of recoil spring means 92 while the outer end 320 of spring means 92 is operatively connected to the housing means 22 which is fixed against rotation by virtue of its connection with support means 340. Therefore, as roller tube 70 and drive hub means 66 are caused to rotate, during the process of extending cover member 13, the recoil spring means 92 is wound tighter generally toward the extension 72 as to thereby produce and accumulate energy for when it is desired to rollingly gather the cover member 13 on and about the roller tube 70. With reference to FIG. 32, it can be seen that as extension 72 rotates clockwise (in the spring tightening direction) that the radially inner most portion of the spring 92 is first drawn toward and onto extension 72 with such action progressing to the radially outer "coils" so that during winding or unwinding the "coils" of the spring means 92 continue to be effectively separated from each other and at least minimize, if not totally eliminate any frictional contact therebetween or thereagainst.

As previously indicated the prior art, as in said U.S. Pat. No. 4,222,601, employed a helical torsion spring (as 68 of said U.S. Pat. No. 4,222,601) for supplying a spring force to wind-up the cover member. A helical spring is one having, in effect, the same shape or configuration as a helical compression or extension spring except that the ends of the helical spring are formed in such a manner that the spring is loaded by a torque applied to such ends and about the coil axis. Helical torsion springs are usually made of closely wound round wire. Further, such helical torsion springs are usually supported on or about a post or pin and when resiliently loaded they are further wound in the same direction in which the spring was wound during the forming thereof. When loaded or deflected in this manner, the inside diameter of helical coils reduces while the number of active helical coils increases. The spring torque-deflection curve of a helical torsion spring is linear so that, for all practical purposes, for each unit deflection a corresponding same unit of torque or force has to be applied. This characteristic is depicted by the dash straight-line curve 352 of the graph of FIG. 43.

The prior art, as in said U.S. Pat. No. 4,139,231 has employed a spiral torsion spring (as 54 of said U.S. Pat. No. 4,139,231) for supplying a spring force to wind-up the cover member. A spiral torsion spring is made of a flat strip or wire material wound on itself, in ribbon style, and which will form a spiral when released to assume its free or unloaded condition. Such spiral torsion springs are usually mounted at the inside end as on a slotted post and are fastened by any of various means at the radially outside end. When such spiral torsion springs are resiliently loaded they are further wound in the same direction in which the spring was wound during the forming thereof so that the resulting stressing resides in the initial bending. The spiral torsion spring, for its physical size, provides for only a relatively small amount of rotation because the coils begin to touch, and thereby experience undesired friction, relatively quickly and not unusually upon attainment of 360° of rotation. Therefore, disproportionately physically large spiral torsion springs must be employed to attain the required spring forces.

Figure 42:
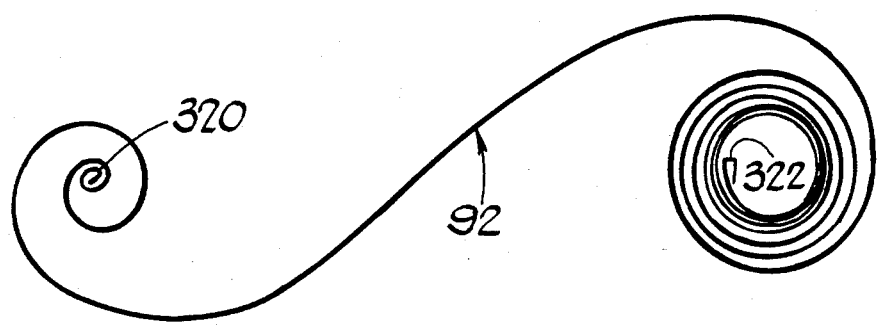
FIG. 42 is a simplified illustration of the preferred type of spring employed in the invention for returning the cover material back into a rolled-up condition.
Figure 43:
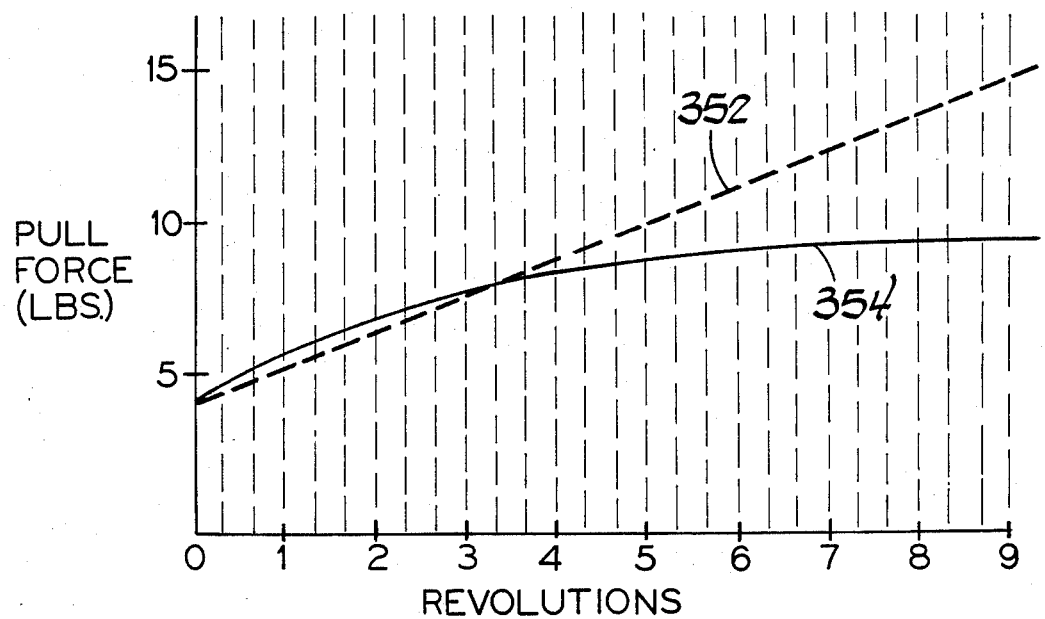
FIG. 43 is a graph typically illustrating the performance of the spring of FIG. 42 compared to that of the prior art.

In comparison, the invention employs a recoil spring means 92 which may be termed a power or retractor spring. The spring means 92 is illustrated in both FIGS. 4 and 32 in somewhat simplified form mostly to depict the interconnection of the spring means 92 with the drive hub means extension 72 and the tubular member 76 of housing means 22. In the preferred embodiment of the invention, the retractor spring means 92, as generally depicted in FIG. 42, is comprised of flat strip metal wound on itself in ribbon style much like the spiral torsion spring except that in the case of the retractor spring means 92 the length of the flat strip material is comparatively much longer and produces many more turns or coils. Further, in the preferred embodiment of the invention, the retractor spring means 92 is also pre-stressed through at least a substantial portion of its entire length and may, in fact, be pre-stressed through substantially its entire length. By way of further explanation, the term "pre-stressed" is employed to describe the manner in which the spring means 92 is formed and employed. That is, referring to FIG. 42, let it be assumed that the entire length of the flat strip, comprising the spring means 92, is first formed by winding such in the direction as depicted by the spirals at the right end of FIG. 42. After such initial forming, the 320 end of spring means 92 is wound in a reverse direction. In the illustration of FIG. 42 it is assumed that only a substantial portion and not the entire length of the spring mens 92 has thusly been reverse wound (as compared to the right end of FIG. 42). Under such assumed conditions, when the spring means 92 is then permitted to assume its free or normal position, it assumes a generally S-shaped configuration as depicted in FIG. 42. If it is now imagined that the pre-stressed retractor spring means 92 as depicted in FIG. 42 is being assembled (to form a part of the overall assembly 10) as hereinbefore described, the end 322, of course, would be inserted into the retaining cavity or recess 280 of drive means 66 and the remainder of the spring means 92 would be wound counterclockwise (as viewed in FIG. 42) until end 320 was inserted into the retaining cavity or recess 210 (FIGS. 20, 21, 24 and 25). By so doing it should be understood that at least that portion of the spring means 92 which has a normal or free configuration (direction of coil) opposite to that at the right end of FIG. 42 undergoes pre-stressing which also serves to urge all of the coils of the retractor spring means radially outwardly at least toward if not totally against the inner cylindrical surface 202 of chamber 174 (FIG. 18). Because of this, as the arbor or projection 72 (FIG. 4) undergoes clockwise rotation, as viewed in FIG. 42, the retractor spring is wound onto projection 72 and effectively pulled away from the cylindrical confines of chamber 174 one coil at a time. Because the amount of active spring material is constantly changing during such rotation, the spring torque-deflection curve of the pre-stressed retractor spring means 92 is non-linear. Further, because of the pre-stressed material of the retractor spring means 92, the spring means 92 will maintain higher torques through more turns this probably being due to such retractor spring means 92 having greater energy storage capacity due to residual stress distribution manufactured into the spring strip prior to placing the spring means 92 into its case which, in the invention, would be chamber 174 (FIG. 18). As a consequence of the foregoing, the pre-stressed retractor or recoil spring means 92 exhibits a spring characteristic which is a relatively flat torque-revolution or deflection curve. Such a characteristic curve is depicted in the graph of FIG. 43 by the solid-line curve at 354.

What this means, as a practical and important matter, is that with the invention as one pulls the cover member 13 from the retracted position to the extended position, the force required to maintain such pulling motion increases at a very gradual rate and not a steadily increasing linear rate as that required by the apparatus of said U.S. Pat. No. 4,222,601 and depicted by curve 352 of FIG. 43. On the contrary, with the invention there is almost a constant magnitude of force required to pull the cover member 13 from its retracted to its extended position. As generally depicted in FIG. 43, nine revolutions of the roller tube in the act of extending the cover member of the apparatus of said U.S. Pat. No. 4,222,601 could require an applied force in the order of 15.0 lbs. while, in comparison, the same number of revolutions of the roller tube 70 of the invention would require an applied force in the order of less than 10.0 lbs. This, in turn, in the invention, produces a smoother and more controlled travel of the cover member 13. With the lower dynamic pull force required by the invention, the cover member 13 is less likely to slip out of the operator's hand, or, if the operator should release the cover member 13 at its extended position, it is much less likely that damage will occur to the assembly 10 or the associated vehicular-carried support means.

Further, it is anticipated that the useful life of the assembly 10 may be in the order of 5,000 cycles (of retraction and extension of the cover member 13) while the expected useful life of the pre-stressed recoil or retractor spring means 92 may be in the order of 100,000 cycles. Accordingly, any loss of recoil force of the retractor spring means 92 over the expected useful life of the assembly 10 is insignificant therefore the assembly 10 never has to be adjusted by the (customer) operator to increase the recoil tension of the retractor spring means.

The invention as herein disclosed provides a vehicle interior cover panel means which is simple to construct and yet provides benefits and operational characteristics not obtainable with the prior art. The minimization of parts comprising the invention, the simplicity in the forming of such parts, the ease of assembly of such parts and the improved retractor spring means have all been clearly disclosed. To this, it should also be remembered that the roller tube 70 of the invention has a special non-uniform outer diameter or cylindrical surface permitting the cover member 13 to be rollingly gathered thereon and rollingly extended therefrom without experiencing a "jerking" type feeling or motion due to the sudden overlapping of the flexible cover member on the roller tube 70.

Although only a preferred embodiment of the invention has been disclosed and described, it is apparent that other embodiments and modifications of the invention are possible within the scope of the appended claims.

What is claimed is:

1. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle whereby said first and second end housing means are restrained against rotation relative to said vehicle, said first end housing means comprising a first wall portion extending generally axially toward said second end housing means, said first wall portion being situated generally radially outwardly of said flexible sheet cover member as to generally circumscribe at least a portion of said flexible sheet cover member when said flexible sheet cover member is wound into a rolled condition onto said roller, said second end housing means comprising a second wall portion extending generally axially toward said first end housing means, said second wall portion being situated generally radially outwardly of said flexible sheet cover member as to generally circumscribe at least a portion of said flexible sheet cover member when said flexible sheet cover member is wound into a rolled condition onto said roller, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coiled retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, and wherein the magnitude of the force required to pull said flexible sheet cover member from a rolled condition on said roller and toward said extended position increases at a gradual non-constant rate whereby the increment of distance that said flexible sheet cover member moves toward said extended position continually increases even though the increment of additional force applied to pull said sheet cover member remains generally constant.

2. A motor vehicle compartment cover assembly according to claim 1 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced radial dimension.

3. A motor vehicle compartment cover assembly according to claim 1 and further comprising spring stop means carried by said central axis and restrained by said central axis from movement beyond a preselected axial position of said central axis toward said first end housing means, and wherein a first end of said first spring means is operatively connected to said spring stop means.

4. A motor vehicle compartment cover assembly according to claim 1 wherein said first pivot means is operatively keyed to said roller for rotation in unison therewith about said central axis.

5. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a width generally co-extensive with said walled portion and a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, attachment means carried by said sheet cover member for securing said sheet cover member to an associated securing means of said vehicle, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coiled retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, and wherein the magnitude of the force required to pull said flexible sheet cover member from a rolled condition on said roller and toward said extended position increases at a gradual non-constant rate whereby the increment of distance that said flexible sheet cover member moves toward said extended position continually increases even through the increment of additional force applied to pull said sheet cover member remains generally constant, wherein said first pivot means is operatively secured to said roller for rotation in unison therewith about said central axis, and wherein said pre-stressed coiled retractor spring is operatively connected to said roller by having an inner coiled end of said pre-stressed coiled retractor spring connected to said first pivot means.

6. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a width generally co-extensive with said walled portion and a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, attachment means carried by said sheet cover member for securing said sheet cover member to an associated securing means of said vehicle, first and second pivot means operatively carried by said roller and situated as to respectively be at least near said first and second ends of said roller and as to respectively by at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coil retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, and wherein the magnitude of the force required to pull said flexible sheet cover member from a rolled condition on said roller and toward said extended position increases at a gradual non-constant rate whereby the increment of distance that said flexible sheet cover member moves toward said extended position continually increases even through the increment of additional force applied to pull said sheet cover member remains generally constant, wherein said first pivot means is operatively secured to said roller for rotation in unison therewith about said central axis, wherein said pre-stressed coiled retractor spring is operatively connected to said first end housing means by having an outer coiled end of said pre-stressed coiled retractor spring secured to said first end housing means, and wherein said pre-stressed coiled retractor spring is operatively connected to said roller by having an inner coiled end of said pre-stressed coiled retractor spring connected to said first pivot means.

7. A motor vehicle compartment cover assembly according to claim 1 wherein said second pivot means is operatively secured to said roller for rotation in unison therewith about said central axis.

8. A motor vehicle compartment cover assembly according to claim 1 wherein each of said first and second end housing means are connected to said central axis as to prevent the free relative rotation of said first and second end housing means about said central axis.

9. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a width generally co-extensive with said walled portion and a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, attachment means carried by said sheet cover member for securing said sheet cover member to an associated securing means of said vehicle, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coiled retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, and wherein the magnitude of the force required to pull said flexible sheet cover member from a rolled condition on said roller and toward said extended position increases at a gradual non-constant rate whereby the increment of distance that said flexible sheet cover member moves toward said extended position continually increases even through the increment of additional force applied to pull said sheet cover member remains generally constant, wherein said second pivot means is operatively secured to said roller for rotation in unison therewith about said central axis, and further comprising spring stop means carried by said central axis and restrained by said central axis from movement beyond a preselected axial position of said central axis toward said first end housing means, wherein a first end of said first spring means is operatively connected to said spring stop means, and wherein said spring stop means is spaced from said second pivot means as not to create any frictional forces therebetween during rotation of said roller and said second pivot means about said central axis.

10. A motor vehicle compartment cover assembly according to claim 1 wherein said first end housing means is of a generally cup-shaped configuration, wherein said first end housing means is effective to encompass a portion of said roller and said flexible sheet cover member, wherein said second end housing means is of a generally cup-shaped configuration, and wherein said second end housing means is effective to encompass a second portion of said roller and said flexible sheet cover member.

11. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a width generally co-extensive with said walled portion and a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, attachment means carried by said sheet cover member for securing said sheet cover member to an associated securing means of said vehicle, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coiled retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, and wherein the magnitude of the force required to pull said flexible sheet cover member from a rolled condition on said roller and toward said extended positon increases at a gradual non-constant rate whereby the increment of distance that said flexible sheet cover member moves toward said extended position continually increases even though the increment of additional force applied to pull said sheet cover member remains generally constant, wherein said generally cylindrical roller is of reduced radial dimension axially along a portion thereof which leads to only one side of said necked slotted opening, wherein when said flexible sheet cover member is wound upon said roller said flexible sheet cover member is wound in a direction so that it first overlays said portion of reduced radial dimension, wherein said first pivot means is operatively secured to said roller for rotation in unison therewith about said central axis, wherein said pre-stressed coiled retractor spring is operatively connected to said first housing means by having an outer coiled end of said pre-stressed coiled retractor spring secured to said first end housing means, wherein said pre-stressed coiled retractor spring is operatively connected to said roller by having an inner coiled end of said pre-stressed coiled retractor spring connected to said first pivot means, wherein said second pivot means is operatively secured to said roller for rotation in unison therewith about said central axis, and further comprising spring stop means carried by said central axis and restrained by said central axis from movement beyond a preselected axial position of said central axis toward said first end housing means, wherein a first end of said first spring means is operatively connected to said spring stop means, wherein said spring stop means is spaced from said second pivot means as not to create any frictional forces therebetween during rotation of said roller and said second pivot means about said central axis, wherein each of said first and second end housing means are connected to said central axis as to prevent the free relative rotation of said first and second end housing means about said central axis, wherein said first end housing means is effective to at least mostly encompass a first portion of said roller and said flexible sheet cover member, and wherein said second end housing means is effective to at least mostly encompass a second portion of said roller and said flexible sheet cover member.

12. A motor vehicle compartment cover assembly according to claim 5 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced radial dimension.

13. A motor vehicle compartment cover assembly according to claim 5 and further comprising spring stop means carried by said central axis and restrained by said central axis from movement beyond a preselected axial position of said central axis toward said first end housing means, and wherein a first end of said first spring means is operatively connected to said spring stop means.

14. A motor vehicle compartment cover assembly according to claim 5 wherein said first pivot means is operatively keyed to said roller for rotation in unison therewith about said central axis.

15. A motor vehicle compartment cover assembly according to claim 5 wherein said second pivot means is operatively secured to said roller for rotation in unison therewith about said central axis.

16. A motor vehicle compartment cover assembly according to claim 5 wherein each of said first and second end housing means are connected to said central axis as to prevent the free relative rotation of said first and second end housing means about said central axis.

17. A motor vehicle compartment cover assembly according to claim 5 wherein said first end housing means is of a generally cup-shaped configuration, wherein said first end housing means is effective to encompass a portion of said roller and said flexible sheet cover member, wherein said second end housing means is of a generally cup-shaped configuration, and wherein said second end housing means is effective to encompass a second portion of said roller and said flexible sheet cover member.

18. A motor vehicle compartment cover assembly according to claim 6 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced radial dimension.

19. A motor vehicle compartment cover assembly according to claim 6 and further comprising spring stop means carried by said central axis and restrained by said central axis from movement beyond a preselected axial position of said central axis toward said first end housing means, and wherein a first end of said first spring means is operatively connected to said spring stop means.

20. A motor vehicle compartment cover assembly according to claim 6 wherein said first pivot means is operatively keyed to said roller for rotation in unison therewith about said central axis.

21. A motor vehcile compartment cover assembly according to claim 6 wherein said second pivot means is operatively secured to said roller for rotation in unison therewith about said central axis.

22. A motor vehicle compartment cover assembly according to claim 6 wherein each of said first and second end housing means are connected to said central axis as to prevent the free relative rotation of said first and second end housing means about said central axis.

23. A motor vehicle compartment cover assembly according to claim 6 wherein said first end housing means is of a generally cup-shaped configuration, wherein said first end housing means is effective to encompass a portion of said roller and said flexible sheet cover member, wherein said seocnd end housing means is of a generally cup-shaped configuration, and wherein said second end housing means is effective to encompass a second portion of said roller and said flexible sheet cover member.

24. A motor vehicle compartment cover assembly according to claim 9 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced radial dimension.

25. A motor vehicle compartment cover assembly according to claim 9 wherein said first pivot means is operatively keyed to said roller for rotation in unison therewith about said central axis.

26. A motor vehicle compartment cover assembly according to claim 9 wherein each of said first and second end housing means are connected to said central axis as to prevent the free relative rotation of said first and second end housing means about said central axis.

27. A motor vehicle compartment cover assembly according to claim 9 wherein said first end housing means is of a generally cup-shaped configuration, wherein said first end housing means is effective to encompass a portion of said roller and said flexible sheet cover member, wherein said second end housing means is of a generally cup-shaped configuration, and wherein said second end housing means is effective to encompass a second portion of said roller and said flexible sheet cover member.

28. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coiled retractor spring, wherein said pre-stressed coiled retractor spring undergoes winding as said roller rotates about said central axis when said flexible sheet cover member is being pulled from said roller toward an extended postion, wherein said pre-stressed coiled retracctor spring while undergoing said winding exhibits a non-linear resilient resistance force against the rotation of said roller, wherein the magnitude of the force required to pull said flexible sheet cover member from a rolled condition on said roller and toward said extended position increases at a gradual non-constant rate whereby the increment of distance that said flexible sheet cover member moves toward said extended position continually increases even though the increment of additional force applied to pull said sheet cover member remains generally constant, wherein said first pivot means is operatively secured to said roller for rotation in unison therewith about said central axis, and wherein said pre-stressed coiled retractor sprng is operatively connected to said roller by having an inner coiled end of said pre-stressed coiled retractor spring connected to said first pivot means.

29. A motor vehicle compartment cover assembly according to claim 28 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced radial dimension.

30. A motor vehicle compartment cover assembly according to claim 28 and further comprising spring stop means carried by said central axis and restrained by said central axis from movement beyond a preselected axial postion of said central axis toward said first end housing means, and wherein a first end of said first spring means is operatively connected to said spring stop means.

31. A motor vehicle compartment cover assembly according to claim 28 wherein said first pivot means is operatively keyed to said roller for rotation in unison therewith about said central axis.

32. A motor vehicle compartment cover assembly according to claim 28 wherein said second pivot means is operatively secured to said roller for rotation in unison therewith about said central axis.

33. A motor vehicle compartment cover assembly according to claim 28 wherein each of said first and second end housing means are connected to said central axis as to prevent the free relative rotation of said first and second end housing means about said central axis.

34. A motor vehicle compartment cover assembly according to claim 28 wherein said first end housing means is of a generally cup-shaped configuration, wherein said first end housing means is effectively to encompass a portion of said roller and said flexible sheet cover member, wherein said second end housing means is of a generally cup-shaped configuration, and wherein said second end housing means is effective to encompass a second portion of said roller and said flexible sheet cover member.

35. A motor vehcile compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a length at least of sufficient extent to cover said compartment, said flexible sheet cover member having an anchor portion at least near one end thereof formed of a predetermined thickness as to fit within said walled portion and yet be unable to pass through said necked opening, said flexible sheet cover member being of a thickness in an area at least near said anchor portion thin enough to pass through said necked opening, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means comprising a pre-stressed coiled retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, wherein the magnitude of the force required to pull said flexible sheet cover member from a rolled condition on said roller and toward said extended position increases at a gradual non-constant rate whereby the increment of distance that said flexible sheet cover member moves toward said extended position continually increases even though the increment of additional force applied to pull said sheet cover member remains generally constant, wherein said first pivot means is operatively secured to said roller for rotation in unison therewith about said central axis, wherein said pre-stressed coiled retractor spring is operatively connected to said first end housing means by having an outer coiled end of said pre-stressed coiled retractor spring secured to said first end housing means, and wherein said pre-stressed coiled retractor spring is operatively connected to said roller by having an inner coiled end of said pre-stressed coiled retractor spring connected to said first pivot means.

36. A motor vehicle compartment cover assembly according to claim 35 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced radial dimension.

37. A motor vehicle compartment cover assembly according to claim 35 and further comprising spring stop means carried by said central axis and restrained by said central axis from movement beyond a preselected axial position of said central axis toward said first end housing means, and wherein a first end of said first spring means is operatively connected to said spring stop means.

38. A motor vehicle compartment cover assembly according to claim 35 wherein said first pivot means is operatively keyed to said roller for rotation in unison therewith about said central axis.

39. A motor vehicle compartment cover assembly according to claim 35 wherein said second pivot means is operatively secured to said roller for rotation in unison therewith about said central axis.

40. A motor vehicle compartment cover assembly according to claim 35 wherein each of said first and second end housing means are connected to said central axis as to prevent the free relative rotation of said first and second end housing means about said cental axis.

41. A motor vehicle compartment cover assembly according to claim 35 wherein said first end housing means is of a generally cup-shaped configuration, wherein said first end housing means is effective to encompass a portion of said roller and said flexible sheet cover member, wherein said second end housing means is of a generally cup-shaped configuration, and wherein said second end housing means is effective to encompass a second portion of said roller and said flexible sheet cover member.

42. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a length at least of sufficient extent to cover said compartment, said flexible sheet cover member having an anchor portion at leat near one end thereof formed of a predetermiend thickness as to fit within said wall portion and yet be unable to pass through said necked opening, said flexible sheet cover member being of a thickness in an area at least near said anchor portion thin enough to pass through said necked opening, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, first spring means for normally resiliently urging said second end housing means axially of said central axis and in a direction away from said first end housing means, said first spring means also allowing said second end housing means to move axially of said central axis in a direction toward said first housing means upon application to said second end housing means of an axially directed force of a magnitude sufficient to overcome the resilient resistance of said first spring means, and second spring means operatively connected to said roller and to said first end housing means, said second spring means coprising a pre-stressed coiled retractor spring, wherein said pre-stressed coiled retractor spring undergoes winding as said roller rotates about said central axis when said flexible sheet cover member is being pulled from said roller toward an extended position, wherein said pre-stressed coiled retractor spring while undergoing said winding exhibits a non-linear resilient resistance force against the rotation of said roller, wherein the magnitude of the force required to pull said flexible sheet cover member from a roller condition on said roller and toward said extended position increases at a gradual non-constant rate whereby the increment of distance that said flexible sheet cover moves toward said extended position continually increases even through the increment of additional force applied to pull said sheet cover member remains generally constant, wherein said second pivot means is operatively secured to said roller for rotation in unison therewith about said central axis, and further comprising spring stop means carried by said central axis and restrained by said central axis from movement beyond a preselected axial position of said central axis toward said first end housing means, wherein a first end of said first spring means is operatively connected to said spring stop means, and wherein said spring stop means is spaced from said second pivot means as not to create any frictional forces therebetween during rotation for said roller and said second pivot means about said central axis.

43. A motor vehicle compartment cover assembly, according to claim 42 wherein said generally cylindrical roller is of reduced radial dimension axially along a portion thereof which leads to only one side of said necked slotted opening, and wherein when said flexible sheet cover member is wound upon said roller said flexible sheet cover member is wound in a direction so that it first overlays said portion of reduced raidal dimension.

44. A motor vehicle compartment cover assembly according to claim 42 wherein said first pivot means is operatively keyed to said roller for rotation in unison therewith about said central axis.

45. A motor vehicle compartment cover assembly according to claim 42 wherein each of said first and second end housing means are connected to said central axis as to prevent the free relative rotation of said first and second end housing means about said central axis.

46. A motor vehicle compartment cover assembly according to claim 42 wherein said first end housing means is of a generally cup-shaped configuration, wherein said first end housing means is effective to encompass a portion of said roller and said flexible sheet cover member, wherein said second end housing means is of a generally cup-shaped configuration, and wherein said second end housing means is effective to encompass a second portion of said roller and said flexible sheet cover member.

47. A motor vehicle compartment cover assembly for use in covering and thereby concealing the contents of a compartment in a motor vehicle comprising in combination an elongated hollow generally cylindrical roller having first and second ends, an elongated central axis having first and second ends, an anchor groove formed in said roller generally parallel to said central axis, said anchor groove comprising a necked slotted opening and a walled portion forming an enlarged cross-sectional enclosure, a flexible sheet cover member having a length at least of sufficient extent to cover said compartment, said flexible sheet cover member having an anchor portion at least near one end thereof formed of a predetermiend thickness as to fit within said walled portion and yet be unable to pass through said necked opeing, said flexible sheet cover member being of a thickness in an area at least near said anchor portion thin enough to pass through said necked opening, first and second pivot means operatively carried by said roller and situated as to respectively be at least near said first and second ends of said roller and as to respectively be at least near said first and second ends of said central axis, said first and second pivot means being journalled on said central axis for rotation thereabout and thereby enabling the rotation of said roller about said central axis, first and second end housing means, said first and second end housing means each being operatively connected to said central axis as to be respectively situated at least near said first and second ends of said central axis, said first and second end housing means being effective for operative connection to associated support means carried by said vehicle, and spring means operatively connected to said roller and to said first end housing means, said spring means being situated generally axially of said roller and beyond said first end of said roller as to thereby be externally of said roller, said spring means comprising a pre-stressed coiled retractor spring, wherein said pre-stressed coiled retractor spring undergoes winding as said roller rotates about asid central axis when said flexible sheet cover member is being pulled from said roller toward an extended position, wherein said pre-stressed coiled retractor spring while undergoing said winding exhibits a non-linear resilient resistance force against the rotation of said roller, and wherein the magnitude of the force required to pull said flexible sheet cover member from a rolled condition on said roller and toward said extended position increases at a gradual non-constant rate whereby the increment of distance that said flexible sheet cover member moves toward said extended positon continually increases even through the increment of additional force applied to pull said sheet cover member remains generally constant.

48. A motor vehicle compartment cover assembly according to claim 47 and further comprising second spring means for normally resiliently urging said second end housing means axially of said central axis and in a direction away from said first end housing means, said second spring means also allowing said second end housing means to move axially of said central axis in a direction toward said first housing means upon application to said second end housing means of an axially directed force of a magnitude sufficient to overcome the resilient resistance of said second spring means.

49. A motor vehicle compartment cover assembly according to claim 47 whereins aid first pivot means is operatively secured to said roller for rotation in unison therewith about said central axis, and wherein said pre-stressed coiled retractor spring is operatively connected to said roller by having an inner coiled end of said pre-stressed coiled reractor spring connected to said first pivot means.

* * * * *